United States Patent [19]
Schlüter et al.

[11] Patent Number: 5,839,754
[45] Date of Patent: Nov. 24, 1998

[54] MULTIPLE STAGE AIRBAG GAS GENERATOR

[75] Inventors: Klaus Schlüter, Eckental; Wolfgang Schwarz, Nürnberg; Gerd Kuscher, Mühlheim; Eugen Feuerstake, Eltersdorf; Martin Klöber, Heideck; Karl-Heinz Schneider, Röthenbach, all of Germany; Kiyoshi Honda; Seiichiroh Kobayashi, both of Saitama-ken, Japan; Junichi Kishimoto, Fukushima-ken, Japan

[73] Assignees: Honda R&D Co. Ltd., Shimotakanezawa; Nippon Koki Co. Ltd., Tokyo, both of Japan

[21] Appl. No.: 659,493

[22] Filed: Jun. 6, 1996

[30] Foreign Application Priority Data

Jun. 8, 1995 [DE] Germany ............... 195 20 847.1

[51] Int. Cl.⁶ .................................................. B60R 21/26
[52] U.S. Cl. ........................... 280/736; 280/741; 102/531
[58] Field of Search ................................ 280/736, 741, 280/742, 740, 737; 102/531, 530

[56] References Cited

U.S. PATENT DOCUMENTS

| | | | |
|---|---|---|---|
| 3,948,540 | 4/1976 | Meacham | 280/737 |
| 4,950,458 | 8/1990 | Cunningham | 280/736 |
| 5,219,178 | 6/1993 | Kobari et al. | 280/736 |
| 5,364,126 | 11/1994 | Kuretake et al. | 280/736 |
| 5,513,879 | 5/1996 | Patel et al. | 280/736 |

FOREIGN PATENT DOCUMENTS

| | | |
|---|---|---|
| 21 50 744 | 4/1978 | Germany . |
| 40 05 768 | 8/1991 | Germany ............... 280/736 |
| 40 19 677 | 1/1992 | Germany ............... 280/736 |
| 4-345556 | 12/1992 | Japan ............... 280/736 |
| 5-319199 | 12/1993 | Japan ............... 280/736 |
| WO 94/06735 | 3/1994 | WIPO . |

*Primary Examiner*—Peter C. English
*Attorney, Agent, or Firm*—Scully, Scott, Murphy & Presser

[57] ABSTRACT

After the pressure of the gas in a first chamber reaches the maximum value, the cover for the air bag is broken up. The cover is broken at the pressure of the maximum value, and there is almost no waste of the gas energy. Thus, the cover can be broken up by the small amount of the gas energy and the heat losses are extremely reduced, so that the amount of the gas generating agents are made small. Also, the cover is broken by the burning of the first chamber and the air bag is inflated at the first stage by expansion and inertia of the gas. There is provided a mechanical timing for ignition delay, and then the bag is fully inflated by the burning of a second chamber. Therefore, the bag can be desirably inflated.

3 Claims, 21 Drawing Sheets

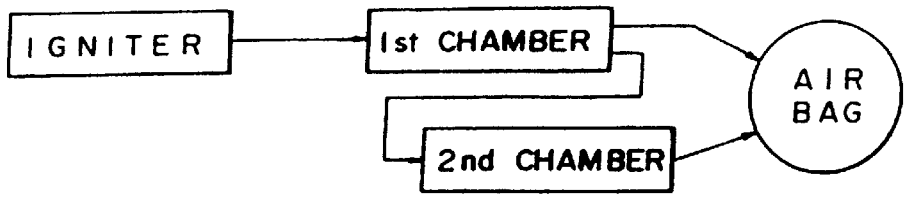
FIG. IA
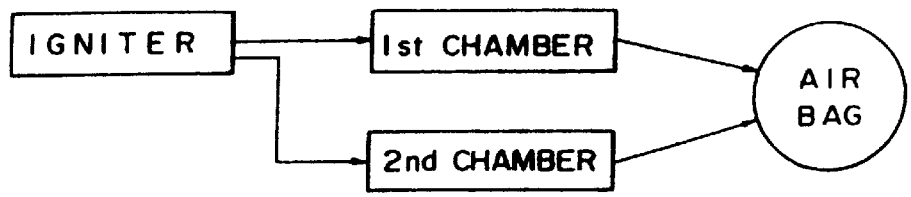
FIG. IB
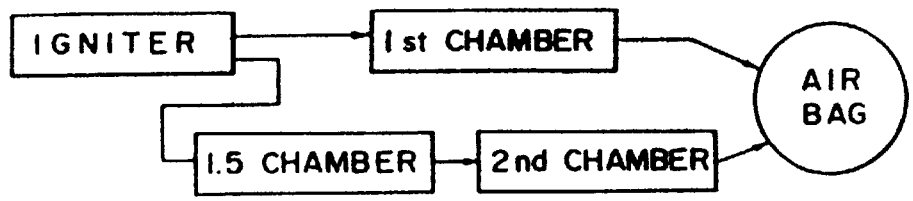
FIG. IC
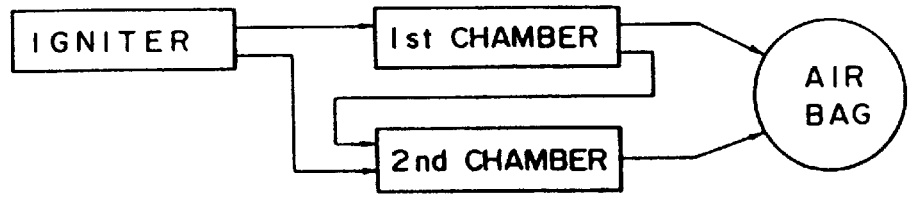
FIG. ID
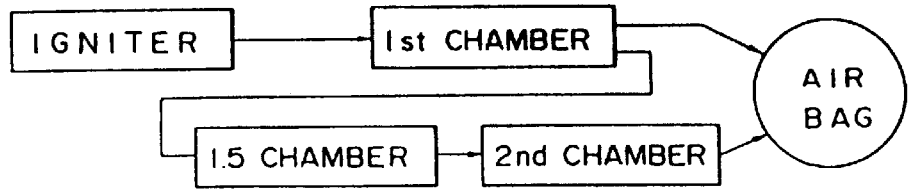
FIG. IE

COMPARATIVE EXAMPLE I

COMPARATIVE EXAMPLE II

MULTIPLE STAGE AIRBAG GAS GENERATOR

BACKGROUND OF THE INVENTION

The present invention relates to a gas generating apparatus for supplying gas into an air bag to inflate and expand the air bag which is installed in a front section in the passenger room of an automobile, for example, the steering wheel or the instrument panel in front of the passenger seat.

In an emergency, e.g., an automobile crash, the air bag apparatus inflates and expands so as to save the driver or the like on the seat. In the air bag apparatus, the automobile crash or the like is detected by sensors so that gas generating agents in the gas generating apparatus, i.e., inflater, are ignited and burned to generate gas. The generated gas is supplied to the air bag folded in the steering wheel or the like so that the air bag rapidly inflates and expands. Therefore, the expanded air bag saves the driver or the like on the seat from hitting against parts in the passenger room, e.g., the steering wheel.

WO 94/06735 discloses both a pyrotechnic mixture in the form of granulate materials and a gas generator of a single-stage type. The granulate materials comprise a nitrogen-generating substance and an inorganic oxidizing agent and as a binder have silicone rubber in a proportion of from 13 to 28% with respect to the weight of the overall mixture. An advantage of that mixture is the burning characteristics which are reproducible in a high-pressure container, with a comparatively low maximum gas pressure. The result of this is that the wall thickness of the gas generator can be thin.

The gas generator comprises a container having a plurality of discharge flow openings, the container containing the granulate material and at least one igniter element. At the periphery the container is surrounded in the region of the discharge flow openings by filters or sieve members.

The granulate material occurs in the container in a loose-fill form, a sealing element in the form of a metal foil protecting the granulate material from contact with the atmosphere.

An impact protection system for the occupants of a motor vehicle is to be found in German patent No. 2150744. It essentially comprises an air bag having a cover, a solid substance gas generator and a sensor which, in the event of the vehicle colliding with another object, triggers inflation of the protective cushion by means of two unequal subflows of gas out of the gas generator. It is provided in that arrangement that the solid substance generator has a high-pressure chamber of a circular ring configuration for accommodating the solid propellant with gas outlet openings leading to the interior of the cushion, on the side of the high-pressure chamber which is remote from the protective cushion cover. A low-pressure chamber is provided in the center of the high-pressure chamber. Flow transfer bores communicate the two chambers. Gas outlet openings lead from the low-pressure chamber to the interior of the cushion, the overall flow cross-section of the gas outlet openings being small in comparison with that of the gas outlet openings of the high-pressure chamber and that of the flow transfer bores between the high-pressure and low-pressure chambers. That impact protection system is intended to provide that the protective cushion is unfolded from the low-pressure chamber by a relatively small amount of gas before the main amount of gas flows at high speed out of the high-pressure chamber into the interior of the cushion. That is intended to prevent excessively high sound pressures.

Related art of the gas generating apparatus is disclosed in U.S. Pat. No. 4,950,458, and Japanese Laid-open Patent Publication (Kokai) 5-319199 or the like.

In U.S. Pat. No. 4,950,458, as shown in FIG. 21, an aluminum housing 100 is divided by a bulkhead 104 into first and second burning chambers 102 and 103. At first, an electrically actuatable igniter 105 arranged in the first chamber 102 ignites a RDC 106, i.e., rapid detonating cord, so that gas generating agents 107 therein are burned. The gas generated in the first chamber 102 is supplied via filters 108 etc., into an air bag (not shown ), and at the same time the gas in the first chamber 102 is supplied to a ball valve 109 associated with the bulkhead 104. When the pressure of the gas in the first chamber 102 reaches a predetermined value, a ball body of the valve 109 is moved so that the gas in the first chamber 102 is supplied into an igniting tube 110 arranged in the second chamber 103. An elongated cast or extruded booster charge inserted in the igniting tube 110 is ignited, and then gas generating agents 111 in the second chamber 103 are burned so that the gas in the second chamber 103 is supplied via filters 112 or the like into the air bag. Thus, there is provided a mechanical timing for ignition delay in the burning of the second chamber 103 after the first chamber 102 has been burned.

In the Japanese Laid-open Patent publication (kokai) 5-319199, as shown in FIG. 22, the gas generating apparatus is provided with a first burning chamber 121 in which agents are burned in advance, and a second chamber 122 in which agents are burned later. The second burning chamber 122 is located in the center of the gas generating apparatus, and the first burning chamber 121 is designed so as to surround the second chamber 122. Openings 124 which are formed in the second chamber 122 and communicate with the air bag (not shown) are directed to the passenger on the seat so as to eject the gas toward the passenger. Openings 123 which are formed in the first chamber 121 and communicate with the air bag are directed to a direction (i.e., upward, downward, rightward, and leftward direction of the passenger) perpendicular to the direction of the openings 124. Therefore, when an igniter 125 is ignited, gas generated by burning in the first chamber 121 is supplied via the openings 123 into the air bag. When the pressure of the gas in the first chamber 121 reaches a predetermined value, members 127 which are closing portions 126 communicating with the second chamber 122 are broken up, so that the gas in the first chamber 121 is ejected into the second chamber 122 via the communicating portions 126. Thus, agents in the second chamber 122 are burned, and gas generated in the second chamber 122 is supplied via the openings 124 into the air bag. As described above, in advance, the gas is ejected from the openings 123 to the upward, downward, rightward, or leftward direction of the passenger, and thereafter, the gas is ejected from the openings 124 toward the passenger on the seat.

In the prior art, generating rate of burned gas, i.e., mass burning rate of the agent, in each burning chamber is given by the following formula, $$m_g = \rho_p A_b \, r \tag{1}$$

where, $\rho_p$ represents a density of the gas generating agent, $A_b$ represents a total area of the outside surface of the gas generating agent, and r represents a distance of the gas generating agent burned per units of time, i.e., linear burning rate. r is given by the following formula, $$r = a \, P^n \tag{2}$$

where, P represents pressure of each burning chamber, and a and n respectively represent constant values determined in accordance with the kind of the agents.

The gas generating agent is usually formed in a shape of disk or tablet so that the total area of the outside surface thereof is reduced as the burning thereof proceeds. As will be understood from the formula (1), the burning rate of the agent decreases as the burning thereof proceeds. But the pressure P in each chamber rises as the burning proceeds, so that, as will be understood from the formula (2), the linear burning rate of the agent increases as the burning thereof proceeds. That is, as will be understood from the formula (1), as the burning of the agent proceeds, there is a tendency that $A_b$ decreases, while r increases. Thus, it is extremely difficult to control the output performance of burning of the agent.

To put it concretely, a Tank Test is known, as a method for evaluating the performance of the gas generating apparatus. In the Tank Test, a gas generating apparatus is activated in a tank having a constant volume, so that the pressure of the gas generated in the tank is recorded in associated with the burning time. FIG. 23 shows results of the Tank Test concerning some examples. In this FIG. 23, curve a represents a typical example of a general gas generating apparatus, curve b represents an example when the gas generating performance of the agent is adjusted or controlled. In order to control the performance, e.g., gas generating speed, there is provided a method for changing the kind or shape of the agent. However, it is difficult to change the kind or shape of the agent of curve a so as to satisfy the curve b, as shown in FIG. 23.

Recently, it is expected that heat losses of the gas are reduced, the amount of the gas generating agents are made small, the gas generating apparatus is miniaturized, so that manufacturing cost is made low. Note that the heat losses are gas energies generated by burning of the gas generating agents, except for the energy used for inflating the air bag.

The heat losses are increased when the gas is flowing in the air bag in the folded condition, at an initial inflating stage. This reason is as follows. The heat losses satisfy the following formula.

$$Q \propto \lambda (T_g - T_b) F \tau / n \qquad (3)$$

Q: heat losses
$\lambda$: thermal conductivity
$T_g$: gas temperature
$T_b$: air bag temperature
F: contact area of gas
$\tau$: contact time of gas
n: contact distance of gas As understood from the formula (3), as the contact area of the gas is made larger, the heat losses may be increased. Also, as the contact time of the gas is taken longer, the heat losses may be increased. Further, as the contact distance of the gas is made smaller, the heat losses may be increased. At the initial inflating stage of the air bag, as the air bag is in the folded condition, the area of the air bag walls with which the flowing gas is in contact is very large. For the same reason, at the initial inflating stage, the time with which the air bag walls are in contact with the flowing gas is very long and the distance between the air bag walls with which the flowing gas is in contact is very small. Therefore, as described above, the heat losses are increased when the gas is flowing in the air bag in the folded condition, at the initial inflating stage.

Under these circumstances, in the gas generating apparatus having two burning chambers, the present inventors bring their attention to a relation between pressures in respective burning chambers and a pressure in the air bag, in order to reduce heat losses of the gases. As a result, the present inventors find a way of reducing the heat losses, according to the pressures relation.

Also, in the above German Patent No. 2150744, the endeavour is to produce gas generators inexpensively and in a compact design configuration. However the known gas generator is cost-intensive as it consists of a comparatively large number of parts which require a relatively high level of assembly expenditure.

Further disadvantages are that for physical reasons, the aim of the application of reducing the sound pressure is not attained as the gas is blown into the bag in two stages, in which case the harmonics component of the resulting sound is elevated in comparison with a single-stage, uniformly rising pressure phenomenon.

In addition, the apparatus shown in Japanese Patent Laid-open Publication (Kokai) 5-319199 has the following defects. Namely, as described in the publication, at the initial inflating stage, the gas is ejected in the upward, downward, rightward, or leftward direction of the passenger. However, as the cover for the air bag must be broken up at the initial stage, the gas immediately after ejection from the openings of the first chamber is forced to flow toward the direction of the cover, i.e., the direction of the passenger. As a result, the air bag cannot be rapidly inflated in the upward, downward, rightward, and leftward direction of the passenger. Therefore, it will take a loss time and great deal of gas generating agents are needed, in order to inflate the air bag.

SUMMARY OF THE INVENTION

The first object of the invention is to provide a gas generating apparatus which reduces the heat losses of the gas, makes the amount of gas generating agents small, and miniaturizes the apparatus and then makes the cost for manufacturing the apparatus low.

The second object of the present invention is to propose a multi-stage gas generator which with a comparatively small charge mass detaches a cover of the air bag and initiates deployment thereof, in order then to inflate the air bag. In that respect the invention seeks to provide that the gas generator comprises few and simple parts and is therefore inexpensive to produce.

According to the present invention, there is provided a gas generating apparatus for an automobile air bag wherein, when an automobile crash is detected, gas generating agents in a first chamber are ignited by an igniter so that a gas generated by burning thereof is supplied to the air bag, while gas generating agents in a second chamber are burned so that a gas generated by burning thereof is supplied to the air bag, characterized in that, after the pressure of the gas in the first chamber reaches a maximum value, a cover for the air bag is broken up, and then the pressure of the gas in the second chamber reaches a maximum value.

In such a manner, after the pressure of the gas in the first chamber reaches the maximum value, the cover for the air bag is broken up. The cover is broken at the pressure of the maximum value, and there is almost no waste of the gas energy. Thus, the cover can be broken up by the small amount of the gas energy and the heat losses are extremely reduced, so that the amount of the gas generating agents are made small.

Also, the cover is broken by the burning of the first chamber and the air bag is inflated at the first stage by expansion and inertia of the gas. There is provided a mechanical timing for ignition delay, and then the bag is fully inflated by the burning of the second chamber. Therefore, the bag can be desirably inflated.

BRIEF DESCRIPTION OF THE DRAWINGS

FIGS. 1A to 1E are block diagrams respectively showing various kinds of modifications of a gas generating apparatus according to a first embodiment of the present invention;

DETAILED DESCRIPTION OF THE PREFERRED EMBODIMENTS

Figure 2:
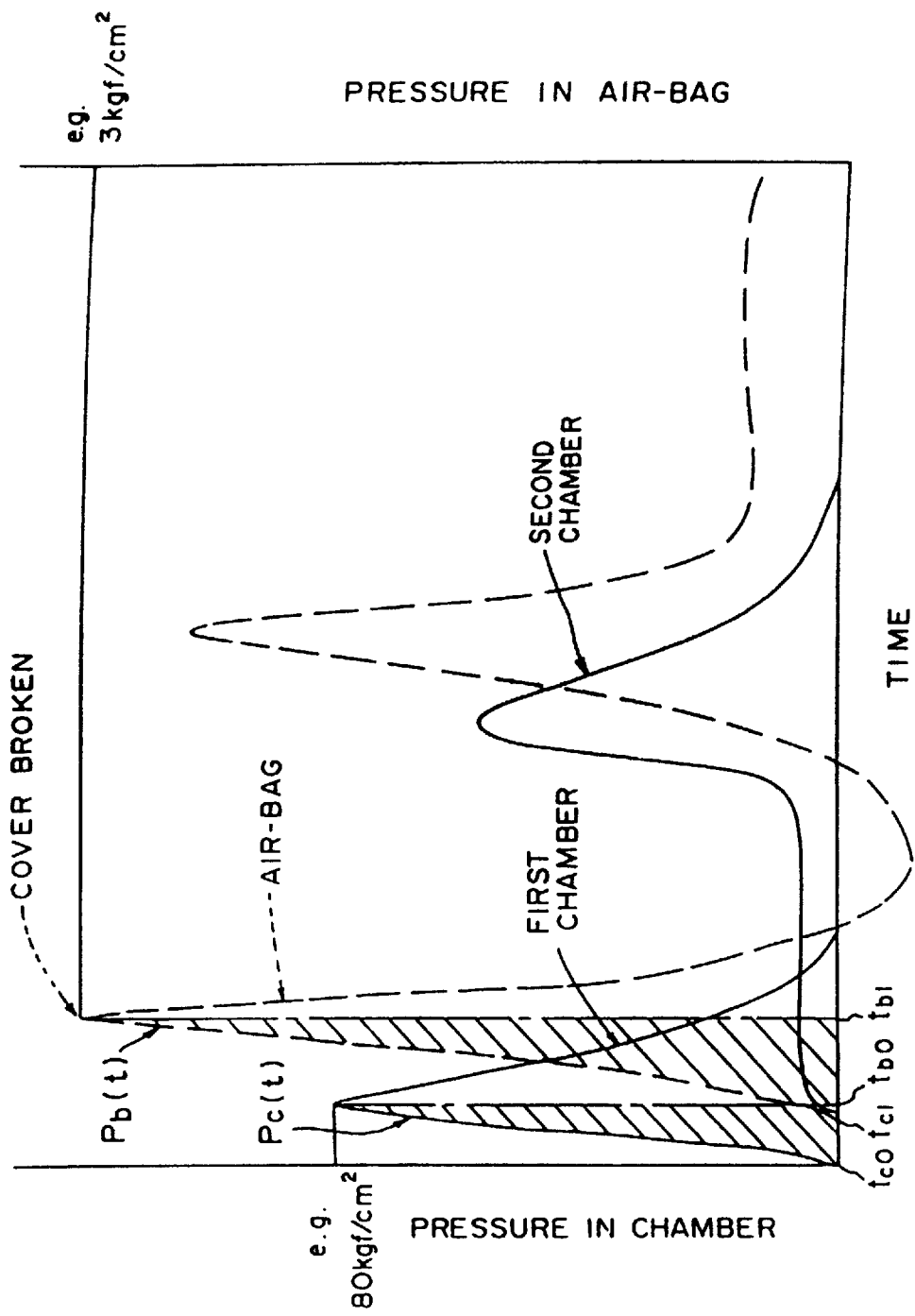
FIG. 2 is a graph showing a relation between pressures in first and second burning chambers of a gas generating apparatus according to the first embodiment, and a pressure in the air bag.
Figure 3:
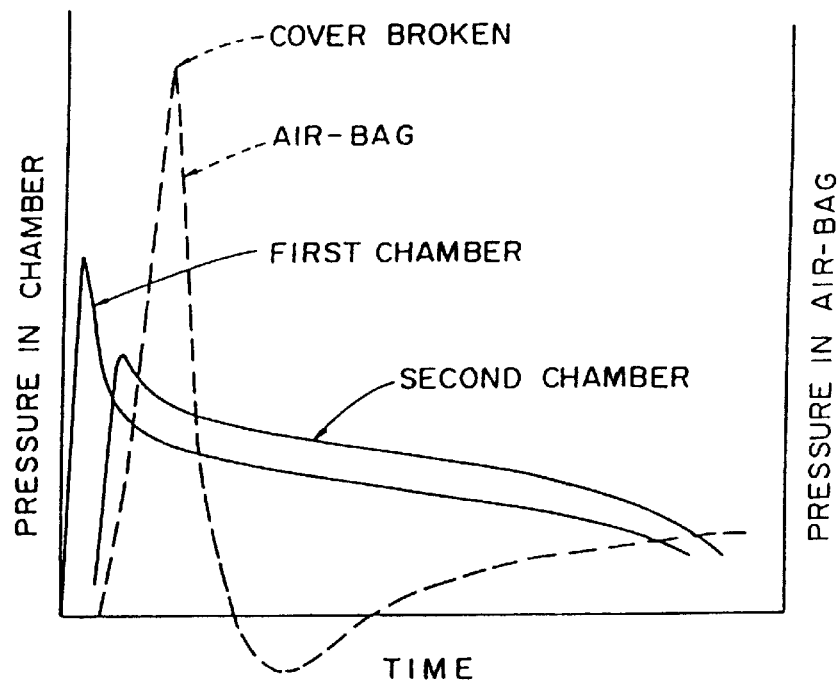
FIGS. 3 and 4 are graphs showing a relation between pressures in first and second burning chambers of a gas generating apparatus according to comparative examples I and II with respect to the first embodiment, and a pressure in the air bag.
Figure 4:
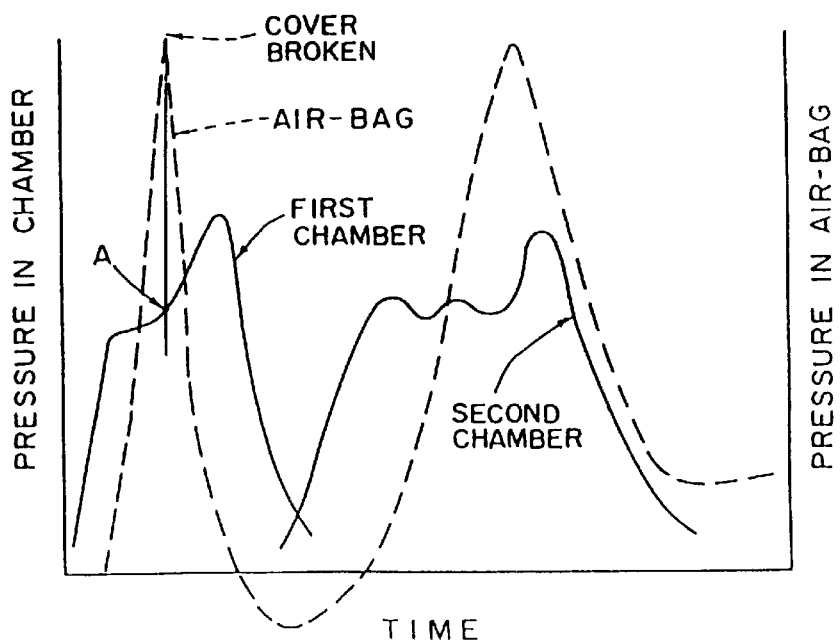

With reference to FIGS. 1 to 4, a gas generating apparatus for an automobile air bag according to a first embodiment of the present invention will be explained. FIGS. 1A to 1E are block diagrams showing various kinds of modifications of the gas generating apparatus according to the first embodiment. FIG. 2 is a graph showing a relation between pressures in first and second burning chambers of the gas generating apparatus according to an example of the first embodiment and a pressure in the air bag. FIGS. 3 and 4 are graphs showing a relation between pressures in first and second chambers of the gas generating apparatus according to comparative examples I and II and a pressure in the air bag.

Now, referring to FIGS. 1A to 1E, structures of the modifications of the gas generating apparatus according to the first embodiment will be described.

In the modification of FIG. 1A, an igniter is communicated with a first burning chamber which is communicated with an air bag and a second burning chamber. The second burning chamber is also communicated with the air bag. Gas generating agents in the first chamber are ignited by the igniter so that burned gas is supplied into the second chamber and the air bag, and then, at a predetermined delayed time, gas generating agents in the second chamber are burned by the burned gas from the first chamber so that the burned gas from the second chamber is supplied into the air bag.

In the modification of FIG. 1B, the igniter is communicated with both the first and second chambers which are communicated with the air bag. The gas generating agents in the first chamber are ignited by the igniter so that burned gas is supplied into the air bag, and then at a predetermined delayed time, the gas generating agents in the second chamber are ignited by the igniter so that the burned gas from the second chamber is supplied into the air bag.

In the modification of FIG. 1C, the igniter is communicated with both the first and 1.5 chambers, the first chamber is communicated with the air bag, and the 1.5 chamber is communicated with the second chamber which is communicated with the air bag. The gas generating agents in the first chamber are ignited by the igniter so that burned gas is supplied into the air bag. The gas generating agents in the 1.5 chamber are ignited by the igniter so that burned gas is supplied into the second chamber. The gas generating agents in the second chamber are burned by the burned gas from the 1.5 chamber so that burned gas from the second chamber is supplied into the air bag.

In the modification of FIG. 1D, the igniter is communicated with the first and second chambers, the first chamber is communicated with both the air bag and the second chamber, and the second chamber is communicated with the air bag. The gas generating agents in the first chamber are ignited by the igniter so that burned gas is supplied into both the air bag and the second chamber. The gas generating agents in the second chamber are ignited by the igniter and the burned gas from the first chamber so that burned gas from the second chamber is supplied into the air bag.

In the modification of FIG. 1E, the igniter is communicated with the first chamber, the first chamber is communicated with both the air bag and the 1.5 chamber, the 1.5 chamber is communicated with the second chamber, and the second chamber is communicated with the air bag. The gas generating agents in the first chamber are ignited by the igniter so that burned gas is supplied into both the air bag and the 1.5 chamber. The gas generating agents in the 1.5 chamber are burned by the burned gas from the first chamber so that burned gas from the 1.5 chamber is supplied into the second chamber. The gas generating agents in the second chamber are burned by the burned gas from the 1.5 chamber so that burned gas from the second chamber is supplied into the air bag.

As is described above, in these modifications of FIGS. 1A to 1E, the burned gas from the first chamber is supplied into the air bag so that a cover for the air bag is broken up and the air bag is inflated at a first stage in a mushroom-shaped configuration. At a predetermined delay time, the burned gas from the second chamber is supplied into the air bag so that the air bag is fully inflated.

The inventors bring their attention to a relation between pressures in the first and second burning chambers and a pressure in the air bag, in the gas generating apparatuses of these modifications of FIGS. 1A to 1E. Thus, the inventors have found out the following optimum relation so as to reduce heat losses.

That is, according to the first embodiment, after the pressure of the gas in the first chamber reaches a maximum value, a cover for the air bag is broken up, and then the pressure of the gas in the second chamber reaches a maximum value. The amount of gas generating agents in each chamber, the generating speed of the burned gas, and delay time or the like are controlled so as to satisfy the pressures relation.

Operation and advantages of the first embodiment will be explained, as compared with comparative examples I and II.

In the comparative example I, as shown in FIG. 3, after the respective pressures of the first and second chambers reach the maximum values, the cover for the air bag is broken up.

The gases from the first and second chambers flow toward the air bag via parts arranged near the gas generating apparatus, such as the air bag, a module cover, and a retainer. Thus, in the comparative example I, before the breakage of the cover, the heats of the gases are transmitted to the above parts arranged near the apparatus. As a result, most of the gas energy is consumed so that comparatively large amount of heat losses are generated. Accordingly, a great deal of gas generating agents are needed in order to inflate the air bag.

In the comparative example II, as shown in FIG. 4, after the cover for the air bag is broken up, the pressures in the first and second chambers reach the maximum values.

In the comparative example II, before the pressure in the first chamber reaches the maximum value, the cover is broken up at a pressure of a point A (FIG. 4). Thus, after the breakage of the cover, when the gas pressure reaches the maximum point, it is merely a waste of the gas energy.

In other words, after the breakage of the cover, the air bag inflates toward a passenger room by means of the expansion and inertia of the gas. However, in the comparative example II, the gas continues to be injected into the air bag for the inflation of air bag after the breakage of the cover so that the gas energy is transmitted to the air bag. Thus, comparatively large amount of heat losses are generated. Accordingly, a great deal of gas generating agents are needed in order to inflate the air bag.

In contrast, according to the first embodiment, as shown in FIG. 2, after the pressure of the gas in the first chamber reaches the maximum value, the cover for the air bag is broken up, and then the pressure of the gas in the second chamber reaches the maximum value.

In such a manner, the cover is broken at the pressure of the maximum value, and there is almost no waste of the gas energy. Thus, the cover can be broken up by small amount of the gas energy and the heat-loss is extremely reduced, so that the amount of the gas generating agents are made small.

Also, the cover is broken up by the burning of the first chamber and a first stage inflation of the air bag is performed by expansion and inertia of the gas. There is provided a mechanical timing for ignition delay, and then the bag is fully inflated by the burning of the second chamber. Therefore, the bag can be desirably inflated.

In the first embodiment, the following is a most optimum amount of the gas generating agents.

As described above, in the embodiment, the gas generated in the first chamber is injected into the air bag which is accommodated in a folded condition in the cover fixed by the retainer etc., and then when the pressure in the air bag reaches a predetermined value (which depends on the way of folding the air bag and the strength of the cover), the cover is broken up so that the air bag is inflated in the passenger room of the vehicle.

That is to say, a part of gas pressure energies in the first chamber is consumed in breaking up the cover and expanding the air bag into the passenger room. The rest of the gas pressure energies is consumed in heating up the first chamber, the parts of the gas generating apparatus, the retainer, and the air bag. The rest of the gas pressure energies also include a heating energy which is lost by expanding the gas as well as a heating energy which heats burned fouling.

This description relates only to a process for breaking up the cover to expand the air bag into the passenger room at the first stage, and does not relate to a process for inflating the air bag perfectly at the second stage.

As shown in FIG. 2, both the pressure in the first chamber and the pressure in the air bag increase with time, reach peak values at predetermined times, respectively, and then decrease thereafter. When the pressure in the first chamber reaches a predetermined value, the cover is broken up.

Also, pressure curves in FIG. 2 represent that the pressures gradually decrease after the pressures reach the peak values. That is, the curve of the pressure decrease in the first chamber is subject to a small variation, depending on the process in which the gas is ejected from the first chamber and expands in the air bag. The curve of the pressure decrease in the air bag is also subject to a small variation, depending on the process in which the cover is broken up and the air bag expands the passenger room, that is, on the way in which the air bag expands. Accordingly, for the sake of facilitating understanding, characteristics of the pressure curves from the starting points to the maximum points will be considered.

Assuming that m represents mass of the gas and v represents speed of the gas, energy of the gas E is given as follows.

$$E = \frac{1}{2} mv^2 = \frac{1}{2m} (mv)^2 \tag{4}$$

It is assumed here that the mass of the gas does not change from the starting point to the maximum point. In the formula (4), mv in the right side of the formula is an impulse. Therefore, where t represents time and F represents force for the work, the formula (4) can be rewritten as follows.

$$E = \frac{1}{2m}(Ft)^2 \quad (5)$$

Further, in the formula (5), assuming A represents area to which the force F is applied, the formula (5) can be rewritten as follows:

$$E = \frac{A^2}{2m}\left(\frac{F}{A}t\right)^2 \quad (6)$$

In the formula (6), F/A represents pressure. Where P represents the pressure.

F/A=P

Therefore, the formula (6) can be rewritten as follows.

$$E = \frac{A^2}{2m}(Pt)^2 \quad (7)$$

Assuming that area A is always constant regardless of time, the energy is proportional to a value which is the square of the pressure multiplied by the time. That is, it can be considered that the energy is proportional to a value equivalent to the square of area below the pressure curve.

Ec represents the gas pressure energy in the first chamber, and Eb represents the gas pressure energy in the air bag, i.e., the energy for breaking up the cover and inflating the air bag. As shown in FIG. 2, pressure curves are represented by Pc(t), Pb(t), so that Ec and Eb are expressed as follows:

$$Ec \propto \left\{\int_{t_{c0}}^{t_{c1}} Pc(t)\,dt\right\}^2 \quad (8)$$

$$Eb \propto \left\{\int_{t_{b0}}^{t_{b1}} Pb(t)\,dt\right\}^2 \quad (9)$$

As described above, the energy Eb for breaking up the cover and expanding the air bag from the cover is a part of the energy Ec generated in the first chamber, so that a value Eb which is divided by Ec, i.e., Eb/Ec (10)

represents efficiency of the gas energy in the first chamber which breaks up the cover and expands the air bag from the cover.

It is assumed that $\mu_b$ and $\mu_c$ respectively represent average values of Eb and Ec, $\xi=\mu_b/\mu_c$ represents the efficiency of the gas generating apparatus according to the first embodiment, and $\xi'=\mu_b/\mu_c$ represents the efficiency of the gas generating apparatus according to prior art. Based on a result of an experiment:

in case where the strength of the cover is high, $\mu_b$=67.5;

in case where the strength of the cover is low, $\rho_b$=2.9;

in case of the gas generating apparatus of the first embodiment, $\mu_c$=272; and in case of the gas generating apparatus of prior art, $\mu_c$=16551

Therefore, in the first embodiment, the value of $\xi$ is as follows;

0.011<$\xi$<0.248 while, in the case of the prior art, $\xi'$ is as follows.

0.00018<$\xi'$<0.0041

Therefore, it can be said that an optimum value of the pressure in the first chamber is obtained when:

the average of the squares of integrated values with respect to the pressure curve for the first chamber of the gas generating apparatus according to the first embodiment, from the starting point to the maximum point thereof, is in a range of from 0.011 to 0.248 of the average of the squares of integrated values with respect to the pressure curve for the air bag from the starting point to the maximum point thereof.

It is easily understood that, as compared the first embodiment value and the prior art value, the heat losses of the first embodiment are much more reduced than that of the prior art.

Further, based on a result of another experiment carried out by the inventors, the following data are obtained.

117<Ec<816

4.1<Eb<83.3

In this case, the efficiency is as follows.

0.00502<$\xi$<0.712

Accordingly, in this case, it is understood the heat losses are much more reduced than the above case.

Now, with reference to FIG. 5, a gas generating apparatus according to a second embodiment of the present invention will be described.

Figure 5:
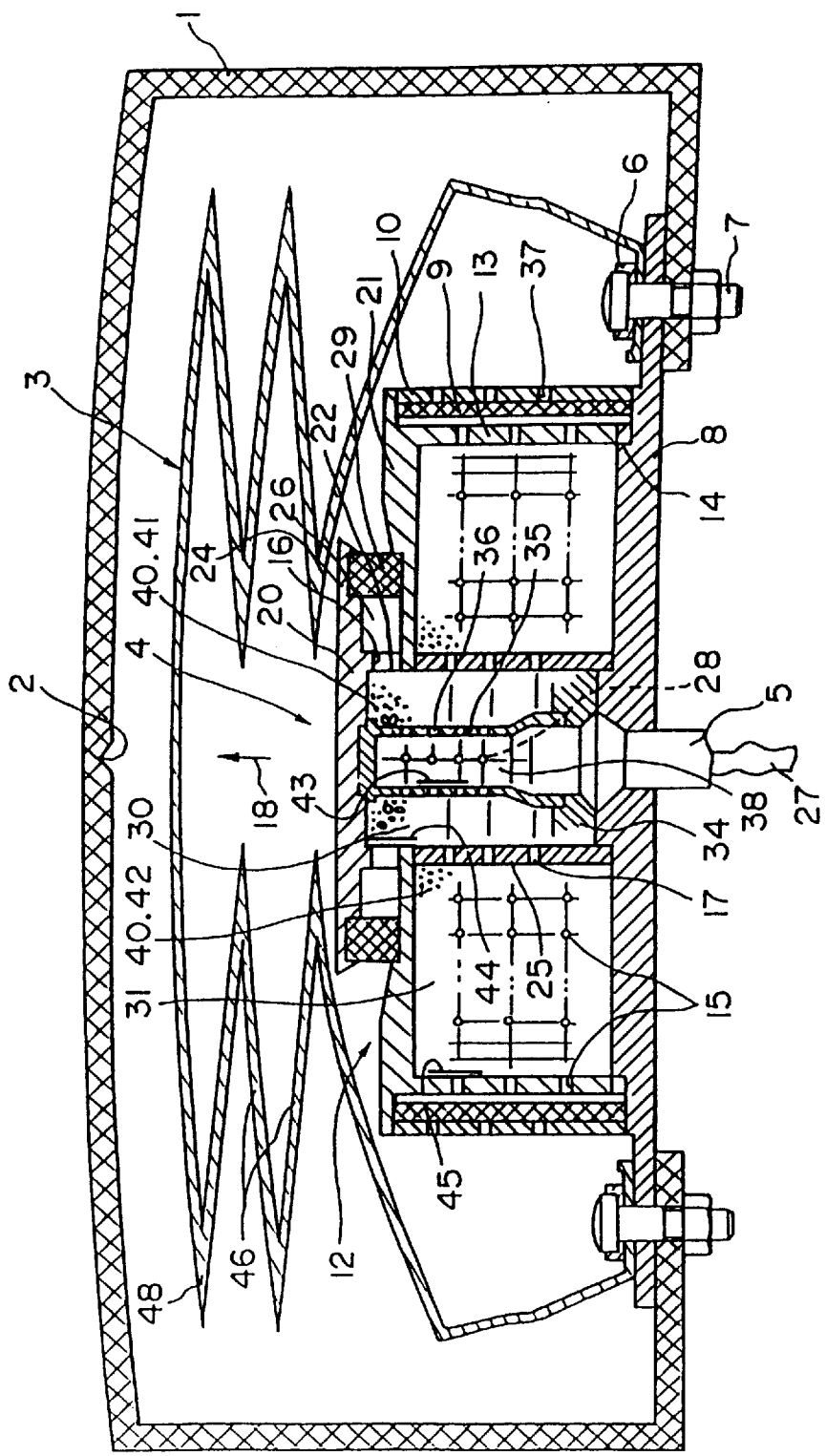
FIG. 5 is a cross-sectional view of a gas generating apparatus according to a second embodiment of the present invention.

FIG. 5 shows the gas generating apparatus with a folded air bag in an expansible container.

Disposed in a circular container 1 with a central desired-rupture location 2 is a folded air bag 3 and a gas generator 4 with an electrical igniter 5.

The container 1 releases the inflated air bag 3, in which case the container 1 breaks open, beginning at the desired-rupture location 2, and thus allows the inflated air bag 3 to issue therefrom.

The air bag 3 is connected by way of an apertured sheet metal ring 6 and screw connections 7 to a base plate 8.

The gas generator 4 comprises a thin-wall, rotationally symmetrical housing 12 whose wall 13 is screwed by way of a screwthread 14 to the base plate 8. The wall 13 has gas bores 15.

In the direction 18 of inflation of the air bag 3 the housing 12 is provided with an end plate 20 and an apertured plate 21, a connecting wall 22 with gas bores 16 being disposed between the end plate 20 and the plate 21. The connecting wall 22 is welded to the apertured plate 21.

A tube 25 with gas bores 17, together with the connecting wall 22 and the apertured plate 21, forms a first chamber 30. At the same time the tube 25, with the wall 13, forms a second chamber 31.

A disc 34 fixes both an igniter housing 35 with gas bores 36 and also the igniter 5. The igniter housing 35 is carried in positively locking relationship on the igniter 5, passes centrally and axially through the first chamber 30, and is also held in positively locking relationship in an opening in the end plate 20.

In the region of the gas bores 15 to 17 the chambers 30, 31 are provided with a self-adhesive aluminum foil and are completely filled with a gas-generating granulate material 40 comprising a charging means in the form of an auxiliary charge 41 and a main charge 42.

The end plate 20 has a flange 24. Disposed between the flange 24 and the apertured plate 21 is a sieve member 29 which is held in position in positively locking relationship. An annular cavity 26 is provided between the sieve member 29 and the connecting wall 22.

At its periphery the cylindrical wall 13 also carries a sieve member 9 with an outer annular wall 10, the latter having gas bores 37.

The igniter 5 with an electrical cable 27 is in accordance with the state of the art. It has an encapsulated gas-generating ignition charge 28.

As shown in FIG. 5, the gas bores 36 of the igniter housing 35 are provided with an aluminum foil 43 at the inner side thereof, the gas bores of the connecting wall 22 are provided with an aluminum foil 44 at the inner side thereof, and the gas bores 15 of the housing wall 13 are provided with an aluminum foil 45 at the inner side thereof. However, these aluminum foils 43, 44, and 45 may be arranged at the outer side thereof, and a plurality of aluminum foils 43, a plurality of aluminum foils 44, and a plurality of aluminum foils 45 may be arranged at inner or outer side thereof.

Regarding the mode of operation:

An electrical firing pulse by way of the cable 27 ignites the ignition charge 28. The gases thereof firstly fill a cavity 38 of the igniter housing 35. As a result the pressure of the gases is relieved. The gas bores 36 distribute the gas uniformly into the first chamber 30, the aluminum foil 43 first being punctured by the gas pressure. The gases ignite the auxiliary charge 41 simultaneously in multiple mode according to the number of gas bores 36. The following pressure shock or surge firstly overcomes the aluminum foil 44 in the region of the gas bores 16 and initiates the phase of deployment of the air bag 3 so that the air bag already assumes a substantially mushroom-shaped configuration due to the pressure shock or surge. When the air bag opens, the container is teared at the desired-rupture location 2.

The pressure surge or shock of the auxiliary charge 41 provides that the inside walls 46 of the air bag no longer lie close together but an internal free volume has already been formed.

In that air bag deployment phase the second chamber is ignited, with the main charge 42 of the gas-generating granulate material, so that after a predetermined optimum delay time the main mass of the gases flows into the air bag 3 and fills same.

That mode of operation provides that the heat losses to the walls 48, which occur in the first phase, remain limited as the small first partial amount of the gases cools down quickly and thus brings heat transfer to the walls 48 to a halt.

The hot gases of the main charge 42, which enter in the second phase, now no longer directly come into contact with the inside walls 46. In particular the relative speeds within the entire gas-wall system are no longer as high as in the first phase so that the heat losses which occur in this second phase are greatly reduced in comparison with the situation where the main mass of the gas has to flow from the outset through the walls 48 which are close together.

The time delay between the first phase and ignition of the main charge 42 is produced by the difference in size of the gas bores 16 relative to the gas bores 17. A crucial consideration is also the total cross-sectional area of the gas bores 16 in comparison with the cross-sectional area of all of the gas bores 17.

The cavity 26 contributes to damping or attenuating the rise in pressure of the auxiliary charge 41, like also the sieve member 29.

A diagrammatically illustrated gas generator 50, according to a first modification of the second embodiment, unlike the operating principle of the gas generator 4 shown in FIG. 5, does not have a first chamber 30 which is disposed radially relative to the igniter housing 35, but it has a first chamber 30 which is arranged axially after the igniter housing 35 and a second chamber 31 which is disposed radially relative to the igniter housing 35 and the first chamber 30 respectively.

Figure 6:
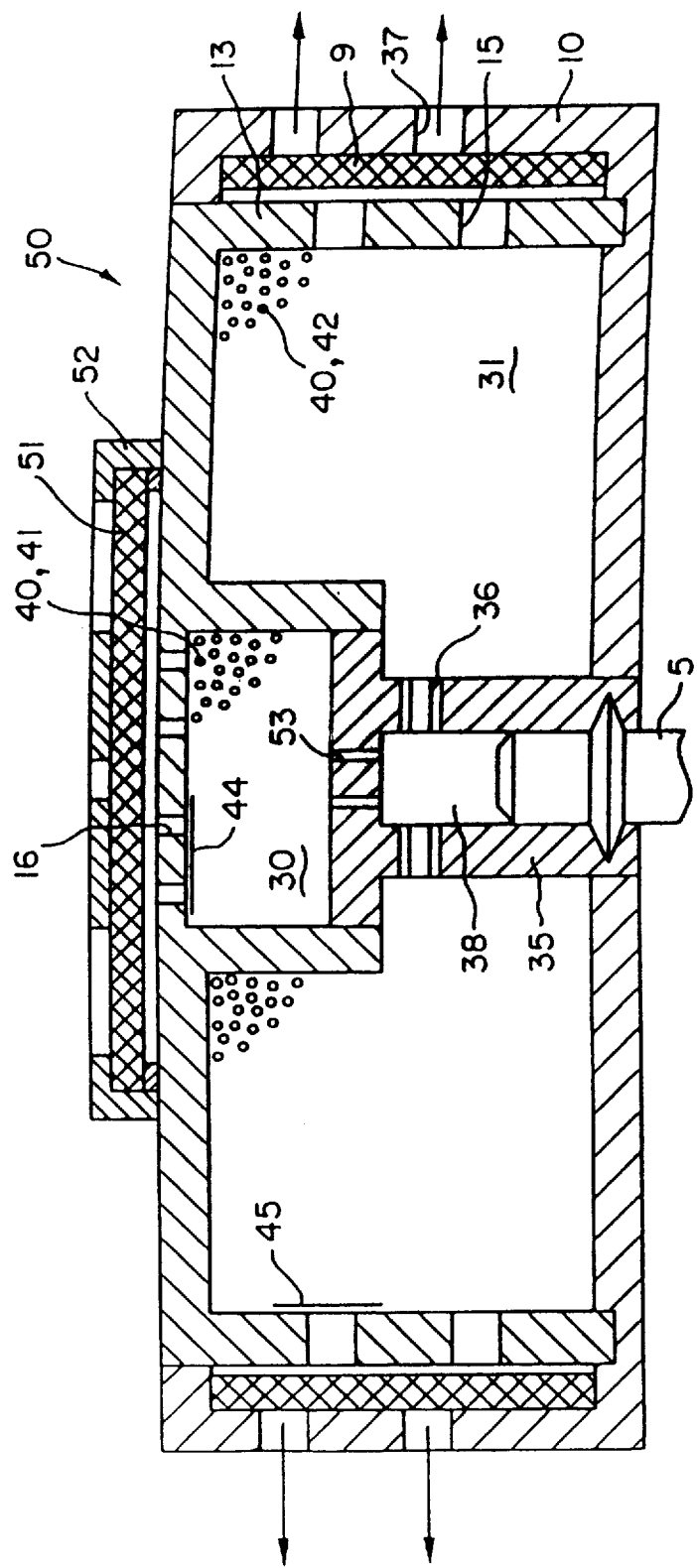
FIG. 6 is a cross-sectional view of a gas generating apparatus according to a first modification of the second embodiment.

As shown in FIG. 6, the sieve member 51 and the sieve member holder 52 correspond in functionally equivalent fashion to the sieve member 29 shown in FIG. 5 and the positively locking retention of the sieve member 29 by the end plate 20.

From the cavity 38 the ignition gases go from the igniter 5 both by way of the gas bores 36 to the second chamber 31 with the main charge 42 and also by way of the gas bores 53 to the first chamber 30 with the auxiliary charge 41.

Firing of the igniter 5 is followed by simultaneous ignition of auxiliary charge 41 and main charge 42 by way of the gas bores 36 and 53. By virtue of a suitable selection in respect of the nozzle diameters and areas of the gas bores 36 and the gas bores 53, it is possible to provide that gas conversion in the main charge 42 takes place somewhat more slowly than in the auxiliary charge 41. The delay which is achieved thereby ensures that the air bag 3 is deployed by the auxiliary charge 41 and is put into a mushroom shape in the same manner as described with reference to FIG. 5. Then after a suitable time delay complete inflation of the air bag 3 is effected by the main charge 42.

Figure 7:
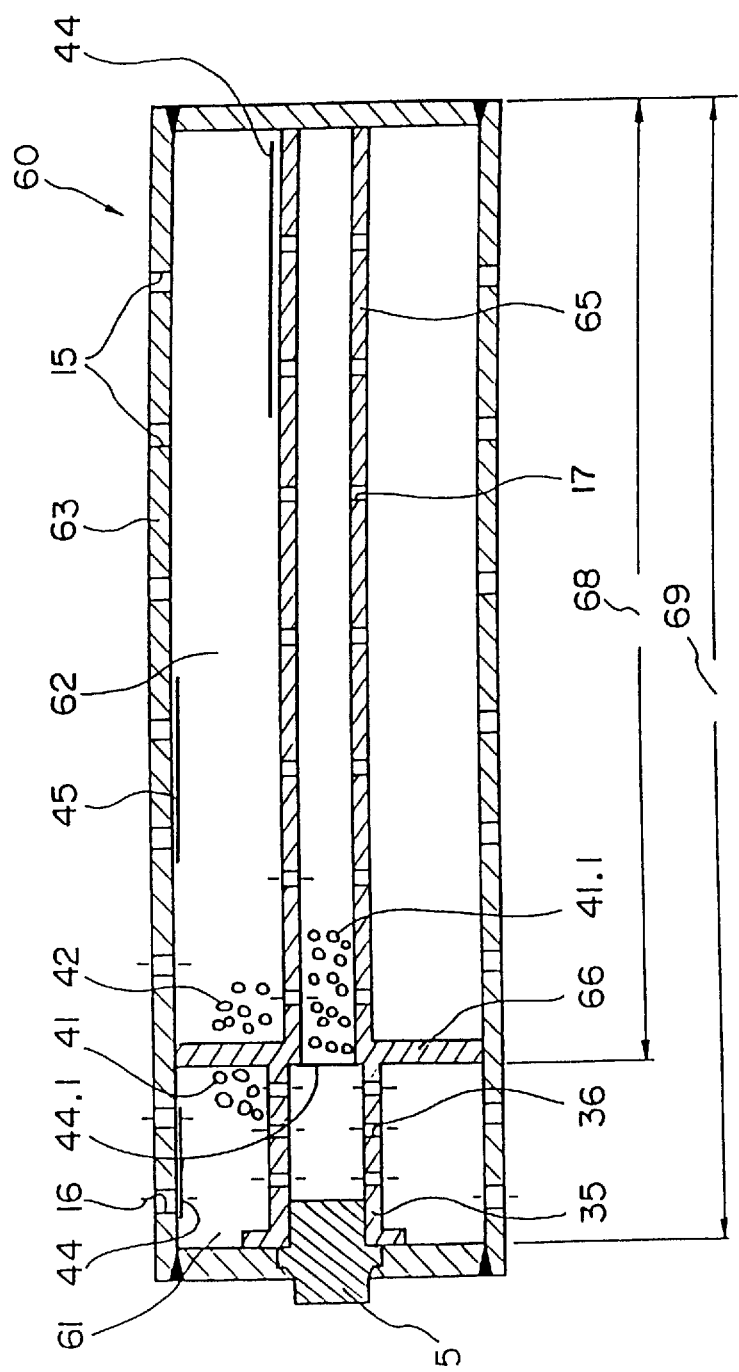
FIG. 7 is a cross-sectional view of a gas generating apparatus according to a second modification of the second embodiment.

A tubular arrangement of a diagrammatically illustrated gas generator 60, according to a second modification of the second embodiment, with a first chamber 61 and a second chamber 62 can be seen in FIG. 7. The chambers 61, 62 are disposed with the igniter 5 and the igniter housing 35 in a tube 63. Fitted to the igniter housing 35 is a somewhat reduced ignition tube 65, with an end flange or collar 66. The tube 65 is of a length 68 which is 80% of the internal length 69 of the tube 63.

The main charge 42 is disposed in the annular space formed by the ignition tube 65 and the tube 63 while the auxiliary charge 41 is disposed around the igniter housing 35 at its periphery and the auxiliary charge 41.1 completely fills up the ignition tube 65. After firing of the igniter 5 the ignition delay for the main charge 42 is produced primarily by the long ignition tube 65 with the comparatively long charge column formed by the auxiliary charge 41.1. A further time delay can be achieved by aluminum foil 44.1 or another suitable membrane or pyrotechnic means. Otherwise the mode of operation of the gas generator 60 corresponds to that of the gas generator 4 described with reference to FIG. 5.

Figure 8:
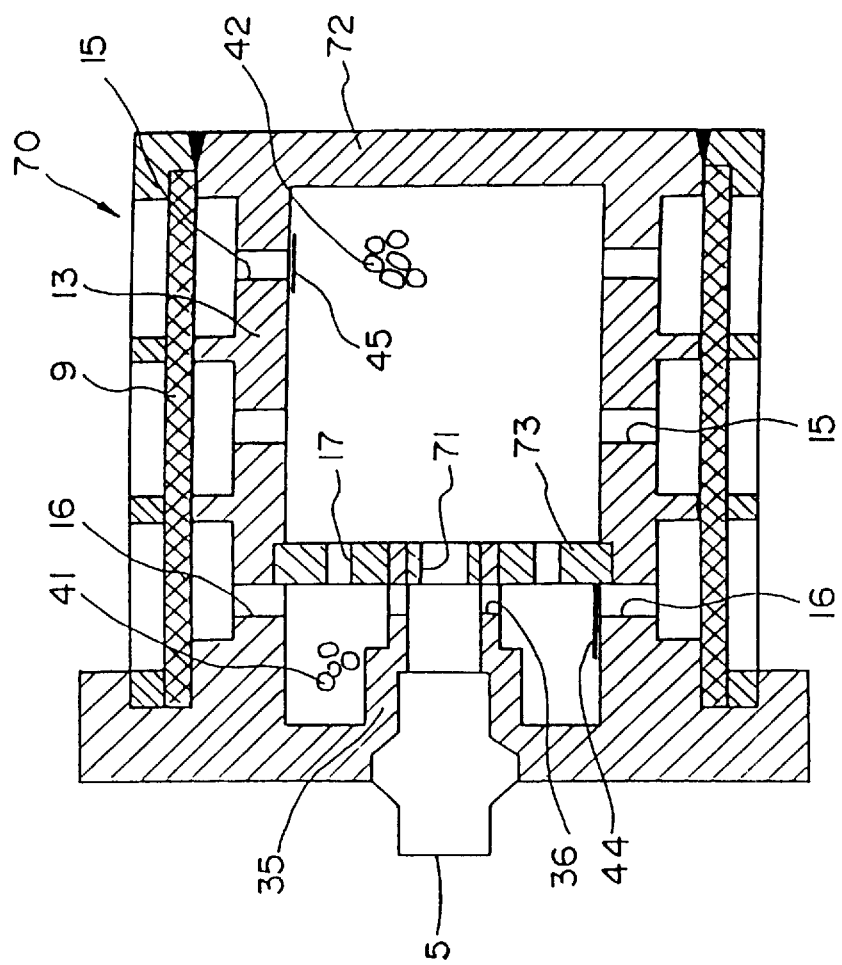
FIG. 8 is a cross-sectional view of a gas generating apparatus according to a third modification of the second embodiment.

A gas generator 70, according to a third modification of the second embodiment, which is also shown in diagrammatic form can be seen from FIG. 8. Unlike the operating principle of the gas generator 4 shown in FIG. 5, this arrangement involves almost simultaneous ignition of the auxiliary charge 41 and the main charge 42 by virtue of the radial gas bores 36 and a gas bore 71 which is disposed coaxially with respect to the igniter 5. Independently thereof, further ignition of the main charge 42 takes place from the auxiliary charge 41 through the gas bores 17. The gas bores 17 and also the gas bores 71 are arranged in a plate 73 which is fixed in a housing 72. The plate 73 bears at its end face against the igniter housing 35. Firing of the main charge 42 is effected both directly by the igniter 5 by way of the ignition bore 71 and also by way of the auxiliary charge 41 and the ignition bores 17. The pressure shock due to the ignited auxiliary charge 41 initiates deployment of the air bag 3 shown in FIG. 5, by way of the gas bores 16. At the same time, by way of the gas bores 17, that pressure shock causes ignition of the main charge 42 in a region which is peripheral relative to the gas bore 71. The gases flowing out of the gas generator 70 are filtered by the sieve member 9.

Figure 9:
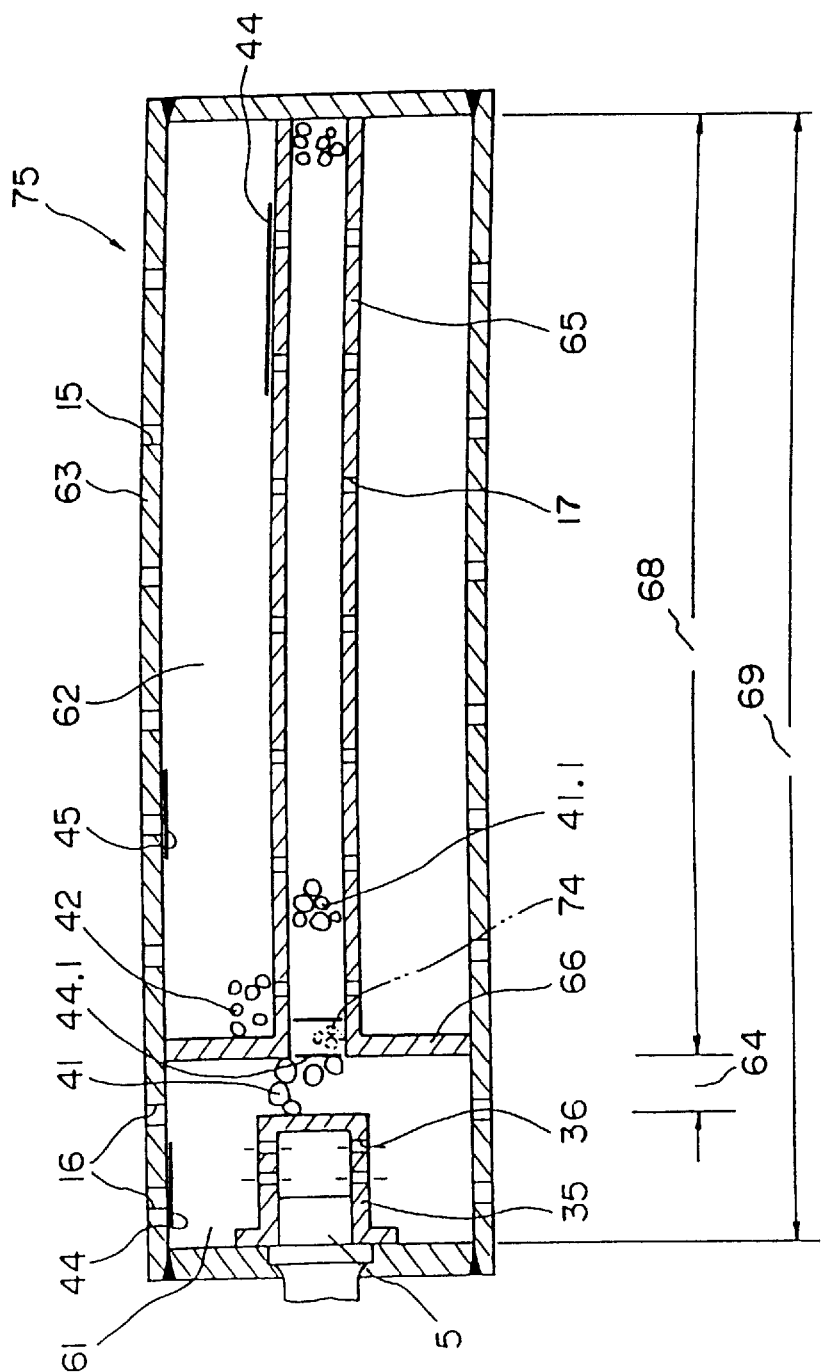
FIG. 9 is a cross-sectional view of a gas generating apparatus according to a fourth modification of the second embodiment.

FIG. 9 shows a further tubular arrangement of a diagrammatically illustrated gas generator 75, according to a fourth modification of the second embodiment. Its structure approximately corresponds to the gas generator shown in FIG. 7. Therefore the same reference numerals are also used for the same components. The chambers 61, 62 are disposed with the igniter 5 and the igniter housing 35 in a tube 63. Fixed in the tube 63 at a spacing 64 is an ignition tube 65 of reduced diameter, with an end flange or collar 66. The ignition tube 65 is of a length 68 which is 80% of the internal length 69 of the tube 63.

The main charge 42 is disposed in the annular space (second chamber 62) formed by the ignition tube 65 and the tube 63 while the auxiliary charge 41 is disposed around the igniter housing 35 at its periphery and the auxiliary charge 41.1 at its end and completely fills up the ignition tube 65. After firing the igniter 5 the auxiliary charge 41 is ignited.

When and the extent to which the second chamber 62 is ignited by way of the ignition tube 65 depends on the development of pressure of the first chamber 61. Delayed ignition of the second chamber can also be influenced by way of a suitable pyrotechnic means 74 or the aluminum foil 44.1 or a membrane (not shown) or by way of a combination of the above-mentioned means. The pyrotechnic means 74 permits combustion in a manner which is defined in respect of time.

The ignition tube 65 may also have another pyrotechnic means or may also be without the auxiliary charge 44.1.

In addition, an ignition moderator (a delaying or boosting composition, for example a B/KNO$_3$ composition) can also be inserted between ignition transfer nozzles and the charge in second chamber to produce a variation in the ignition delay to the desired degree.

An important consideration for the present invention are the short paths for the gases from the second chamber into the air bag. As a result of that the heat and pressure losses are low.

Another important consideration is that the gases of the electrical igniter which has an integrated gas-generating charge expand in the igniter housing. Ignition of the granulate material is then effected specifically by way of the bores. That provides for simultaneous and locally distributed ignition of the granulate material.

Figure 10:
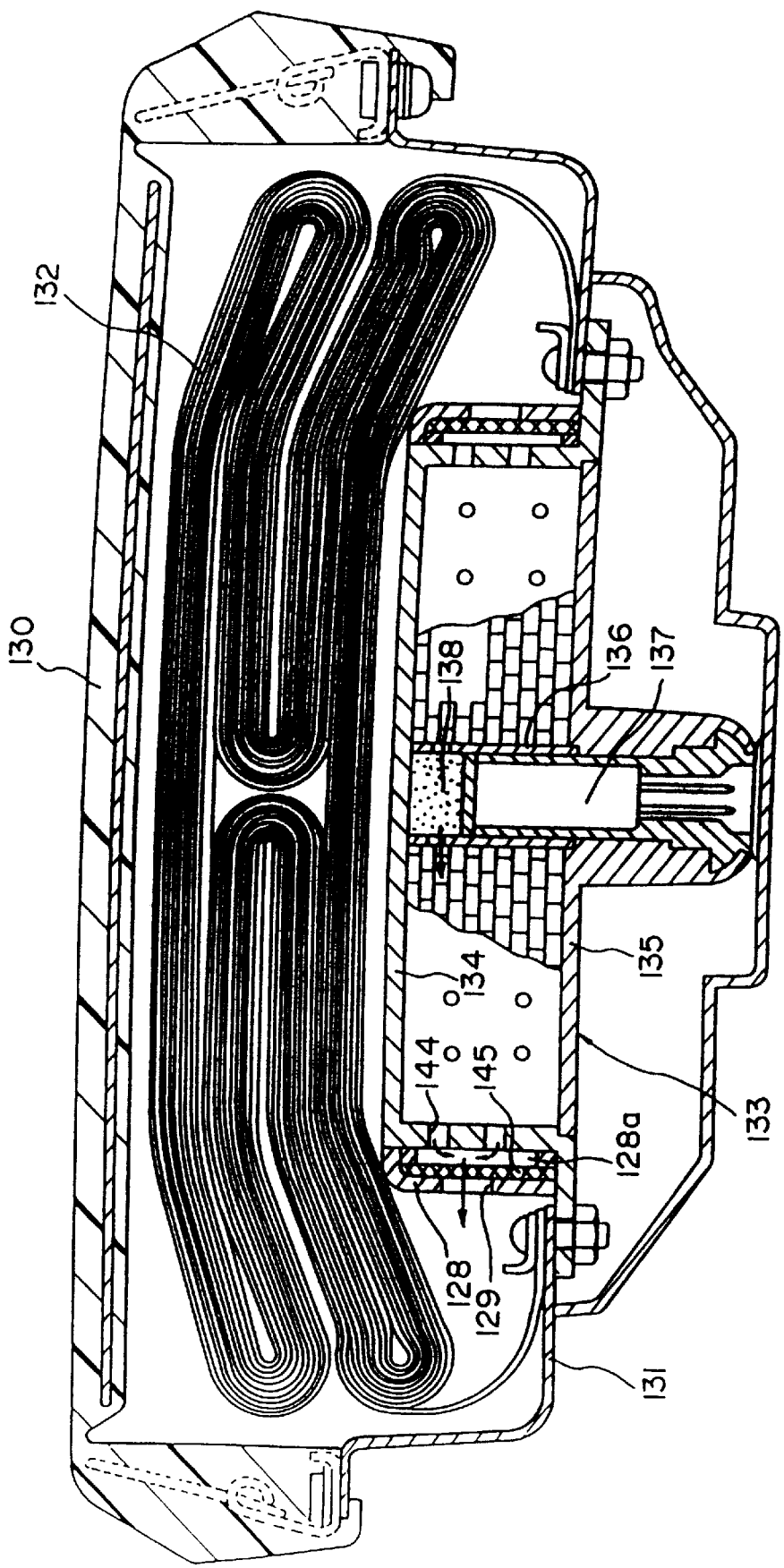
FIG. 10 is a cross-sectional view taken along line X—X in FIG. 11 showing a center portion of a steering wheel to which a gas generating apparatus is attached, according to a third embodiment of the present invention.
Figure 11:
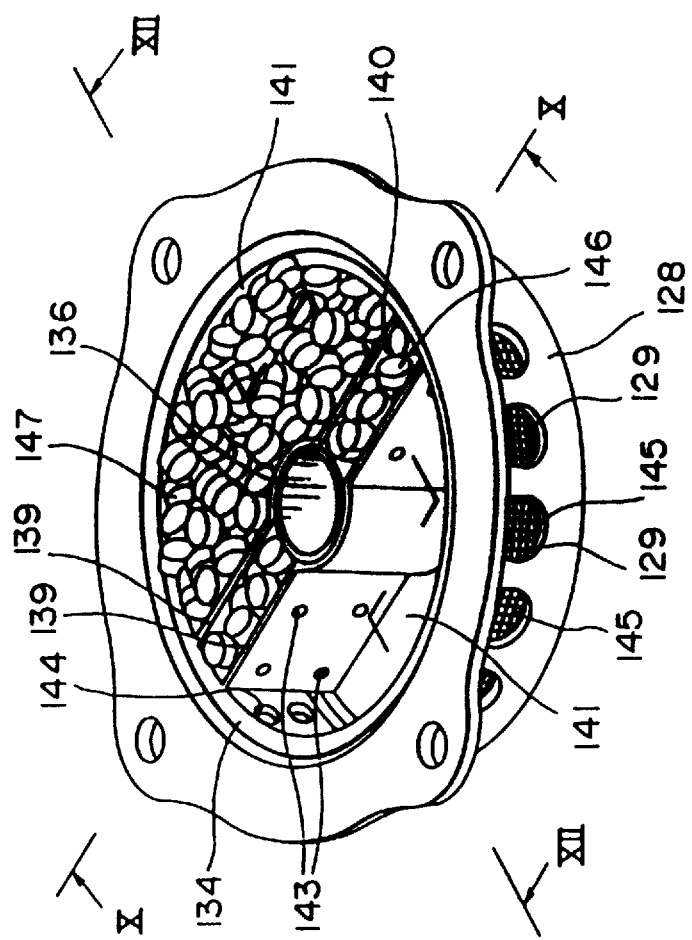
FIG. 11 shows a perspective view of an upper housing of the gas generating apparatus shown in FIG. 10.
Figure 12:
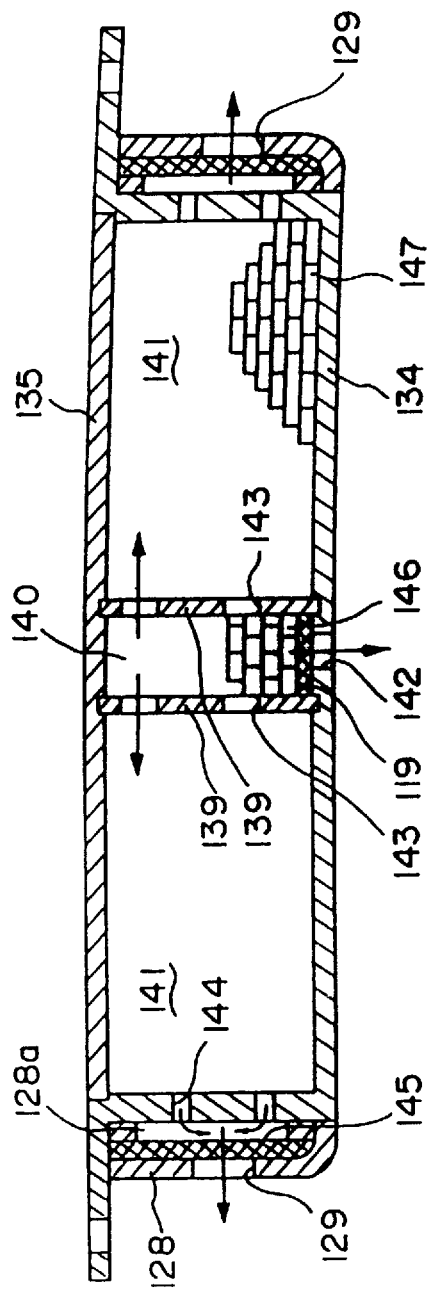
FIG. 12 shows a cross-sectional view of FIG. 11 taken along the line of XII—XII thereof.

Now, referring to FIGS. 10 to 12, a gas generating apparatus according to a third embodiment of the present invention will be described. FIG. 10 is a view in section of a center portion of a steering wheel to which the gas generating apparatus is attached (the cross-section of FIG. 10 is corresponding to the line X—X of FIG. 11.). FIG. 11 is a perspective view of an upper housing of the gas generating apparatus shown in FIG. 10. FIG. 12 is a view in section along the line XII—XII of FIG. 11.

As shown in FIG. 10, a center portion, i.e., a hub, of the steering wheel is provided with a cover 130 made of urethane resin, and a lower housing 131 engaged with the cover 130. An air bag 132 in a folded condition is arranged in the cover 130 and the lower housing 131, and a gas generating apparatus 133 is arranged adjacent to the air bag 132. The gas generating apparatus 133 is provided with an upper housing 134 located on an upper side thereof, and a lower housing 135 engaged with the upper housing 134 and located on the lower side thereof. These housings 134 and 135 enclose a cylindrical member 136 positioned in the center thereof, and an electrically actuatable igniter assembly 137 arranged in the cylindrical member 136. A predetermined volume of a space 138 defined above the initiator 137 may be filled with an ignitable material (not shown), depending on the kinds of gas generating agents and so on. An outer housing 128 is arranged outwardly at radial direction of the housing 134.

According to the present embodiment, as shown in FIGS. 11 and 12, the housings 134 and 135 are provided with two bulkheads 139 and 139 formed of a pair of plate members which surround the cylindrical member 136 and are arranged in parallel with each other so as to connect the walls of the housings. A first burning chamber 140 is defined inside of the bulkheads 139 and 139, and second burning chambers 141 and 141 are defined outside of the bulkheads 139 and 139. As shown in FIG. 12, the upper wall of the housing 134 is provided with communicating portions 142 communicating with the air bag 132. The communicating portions 142 are, for example, a large number of through-holes, and may have a filter 119, depending on the kinds of the gas generating agents. Further, bulkheads 139 and 139 comprise communicating portions 143 communicating with the first and second chambers 140 and 141. The communicating portions 143 are, for example, a large number of through-holes, and may have films or plates so as to allow the gas to pass therethrough when the pressure of the gas in the first chamber 140 will reach a predetermined value. Also, the communicating portions 143 may have relief valves so as to allow the gas to pass therethrough when the pressure in the first chamber 140 reaches a predetermined value. Further, the outer wall of the second chamber 141 comprises communicating portions 144 communicating with the predetermined volume of the space 128a of the outer housing 128. The communicating portions 144 are, for example, a large number of through-holes. The outer housing 128 is provided with communicating portions 129 communicating with the air bag 132. The communicating portions 142 and 129 are respectively provided with filters 119 and 145 for the gas, but these communicating portions 142 and 129 may not have these filters 119 and 145, depending on the kinds of the gas generating agents.

Also, the bulkheads 139 and 139 may not always be arranged in parallel with each other. For example, as the bulkheads 139 and 139 are extended outwardly in the radial direction, the bulkheads 139 and 139 are gradually separated from each other. The bulkheads 139 and 139 may be extended in parallel at the center thereof, and then gradually separated from each other at the peripheral sides thereof. That is, the bulkheads 139 and 139 may be formed in whatever shapes or configurations.

Further, gas generating agents 146 and 147 are respectively accommodated in the first and second chambers 140 and 141. The gas generating agents 146 and 147 may be the same kinds of compositions, or may be different kinds of compositions. Further, the agents 146 and 147 of the embodiment are formed in shapes of tablets, but they may be formed in shapes of disks, tablet or granules.

Further, the agents 146 and 147 may be composed of whatever kinds of material, but the following examples are more desirable. As a first example of the agents 146 and 147, each gas generating agent, in a shape of granule, includes nitrogen generating material, especially, alkaline metal azide, alkaline earth metal azide, or ammonium azide, inorganic oxidant, and silicone rubber or resin as a binder, said granule-shaped agent includes a plurality of particles, each particle having a diameter of 1 μm to 200 μm, and composed of nitrogen generating material, inorganic oxidant, and silicone rubber or resin binding them, and the content of silicone rubber or resin is 13 to 28% in weight of the total mixture. As a second example of the agents 146 and 147, each gas generating agent is a propelling agent generating nonpoisonous gas and includes nitrogen generating material, especially, alkaline metal azide, or alkaline earth metal, inorganic oxidant consisting of alkaline metal nitrate, and/or alkaline earth metal nitrate, and silicone rubber or resin, the agent contains azide of 35 to 60 weight %, nitrate of 20 to 45 weight %, and silicone rubber or resin of 13 to 28 weight %, azide and nitrate, in shapes of particles, respectively have diameters of 1 μm to 200 μm, and the bulk density of the particles is 0.35 to 1.2 g/cm$^3$. In this case, the amount of gas generated per units of weight of the agent is increased, and the gas of high temperature is efficiently generated by the comparatively small amount of the agent. The agent has a shape of granule, has low cost, and resists shock and vibration. The performance change due to circumstantial temperature is reduced. The reacted product has low poison so that filters are not needed. The burning pressure is low so that the gas generating apparatus is miniaturized and the temperature of the outside surface of the housing is low.

Further, by the communicating portions 143 of the bulkhead 139, there is provided mechanical timing for ignition delay in the burning of the second chamber 141 after the burning of the first chamber 140, and the delay speed is controlled by the diameter, length, or number of the communicating portions 143 of the bulkhead 139.

Further, in the third embodiment, as same as the first embodiment, after the pressure of the gas generated by burning of the agents 146 in the first chamber 140 reaches a maximum value, the cover 130 for the air bag 132 is broken up, and then the pressure of the gas generated by burning of the agents 147 in the second chamber 141 reaches a maximum value. Thus, as described above, heat losses are extremely reduced.

A direction for ejecting the gas from the first chamber 140 is set to correspond with a direction of the passenger on the seat, and a direction for ejecting the gas from the second chamber 141 is set to be substantially perpendicular to the ejecting direction of the first chamber 140. That is, the communicating portions 142 of the first chamber 140 are set to eject the gas toward the passenger, and the communicating portion 129 communicating with the second chamber 141 via the communicating portions 144 and the volume 128a are set to eject the gas in upward, downward, rightward, and leftward directions of the passenger. The communicating portions may be directed to the same direction.

Also, when the gas generating agents 146 and 147 of the first and second chambers 140 and 141 have the same compositions and shapes, the amount of the gas generated per unit of time by the agents 146 in the first chamber 140 is made smaller than that of the gas generated per unit of time by the agents 147 in the second chamber 141. Therefore, in the Tank Test, at the initiate inflating stage of the air bag, the pressure in the tank decreases, and, at the second inflating stage thereof, the pressure in the tank rapidly increases. As a result, the pressure performance of the Tank Test comes more and more close to the substantially S letter-shaped curve b in FIG. 23, and the air bag can be desirably inflated.

Further, in manufacturing the gas generating apparatus, when the agents 146 and 147 are accommodated in the housing 134, if the agents 146 and 147 are fallen down into the housing 134, predetermined amount of agents 146 and 147 are accommodated in the first and second chambers 140 and 141. Thus, the manufacturing process can be made easy.

The following is a description of operation of the third embodiment.

The electrically actuatable igniter assembly 137 is ignited so that the agents 146 in the first chamber 140 are burned. The gas is ejected from the first chamber 140 via the communicating portions 142 into the air bag 132, and at the same time the gas is ejected from the first chamber 140 via the communicating portions 143 into the second chamber 142 so that the agents 147 therein are burned. The gas is ejected from the second chamber 141 via the communicating portions 144, the space 128a of the outer housing 128, and the communicating portions 129 into the air bag 132.

As described above, first, the gas from the first chamber 140 is injected into the air bag 132 in the folded condition so that cover 130 for the air bag is broken up, and thereafter, the air bag removed from the cover is rapidly inflated by the gas from the second chamber 141. That is, a small amount of the gas is ejected, and then, with a predetermined delay in time, a large amount of gas is ejected. The small amount of gas is used for breaking up the cover 130 of the air bag 132, while the large amount of gas is used for inflating and expanding the air bag 132.

The cover 130 is broken at the pressure of the maximum value, and there is almost no waste of the gas energy. Thus, the cover 130 can be broken up by the small amount of the gas energy and the heat losses are extremely reduced, so that the amount of the gas generating agents are made small.

Also, the cover 130 is broken by the burning of the first chamber 140 and the air bag 132 is inflated at the first stage by the expansion and the inertia of the gas. There is provided a mechanical timing for ignition delay, and then the bag 132 is fully inflated by the burning of the second chamber 141. Thus, the pressure performance of the Tank Test comes more and more close to substantially S letter-shaped curve b in FIG. 23, and the air bag can be inflated appropriately.

Further, first, the gas is ejected from the communicating portions 142 of the first chamber 140 toward the passenger, and then the gas is ejected from the portions 129 communicating with the second chamber 141 toward a direction perpendicular to the passenger. Breaking up the cover 130 for the air bag 132 can be facilitated by the gas initially ejected toward the passenger. As a result, the amount of the gas for breaking up the cover 130 at the initial stage can be decreased.

Figure 13:
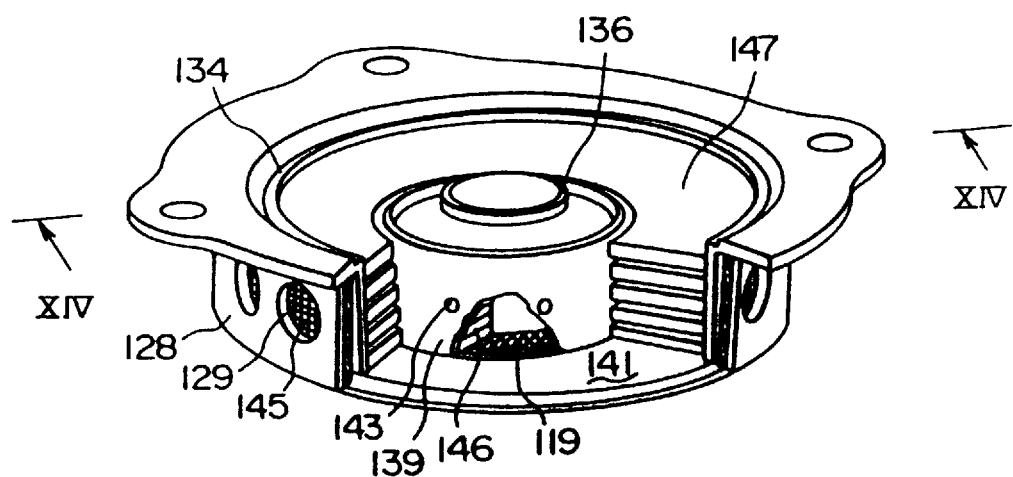
FIG. 13 shows a perspective view of an upper housing of a gas generating apparatus according to a first modification of the third embodiment.
Figure 14:
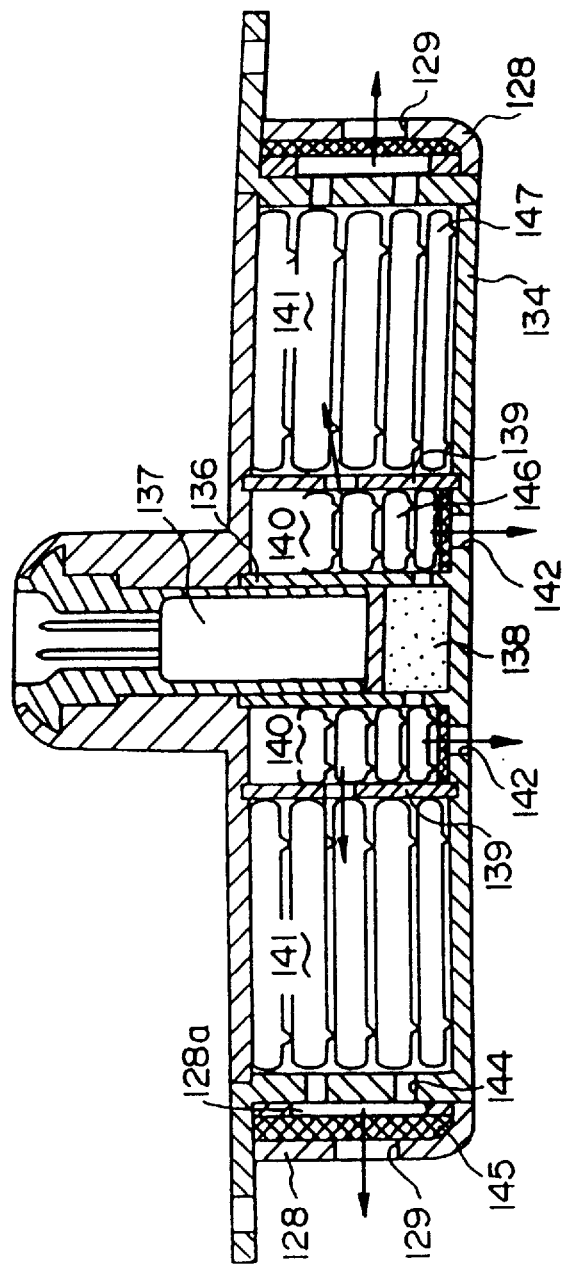
FIG. 14 shows a cross-sectional view of the apparatus of FIG. 13 taken along the line XIV—XIV thereof.

With reference to FIGS. 13 and 14, a first modification of the third embodiment will be explained. FIG. 13 is a perspective view of an upper housing of the gas generating apparatus according to the first modification. FIG. 14 is a cross-sectional view of the apparatus of FIG. 13 taken along the line XIV—XIV thereof. The numerals in FIGS. 13 and 14 which are as same as the numerals in FIGS. 10 to 12 denote the same members thereof.

In the present embodiment, the bulkhead 139 is formed in a cylindrical shape concentric with the cylindrical member 136 of the igniter 137, so that the first and second chambers 140 and 141 are arranged concentrically with each other. Also, the gas generating agents 146 and 147 are formed in shapes of disk, but they may be formed in shapes of tablet or granule.

Further, the communicating portions 143 of the bulkhead 139 are shifted in the circumferential direction with respect to the communicating portions 144 of the second chamber 141. In addition, these communicating portions may not be shifted in the circumferential direction.

In this modification, by the communicating portions 43 of the bulkhead 139, there is provided mechanical timing for ignition delay in burning of the second chamber 141 after burning of the first chamber 140, and the delay speed is controlled by the diameter, length, or number of the communicating portions 143 of the bulkhead 139.

Further, in this modification, after the pressure of the gas generated by burning of the agents 146 in the first chamber 140 reaches a maximum value, a cover 130 for the air bag 132 is broken up, and then the pressure of the gas generated by burning of the agents 147 in the second chamber 141 reaches a maximum value. Thus, as described above, heat losses are extremely reduced.

Figure 15:
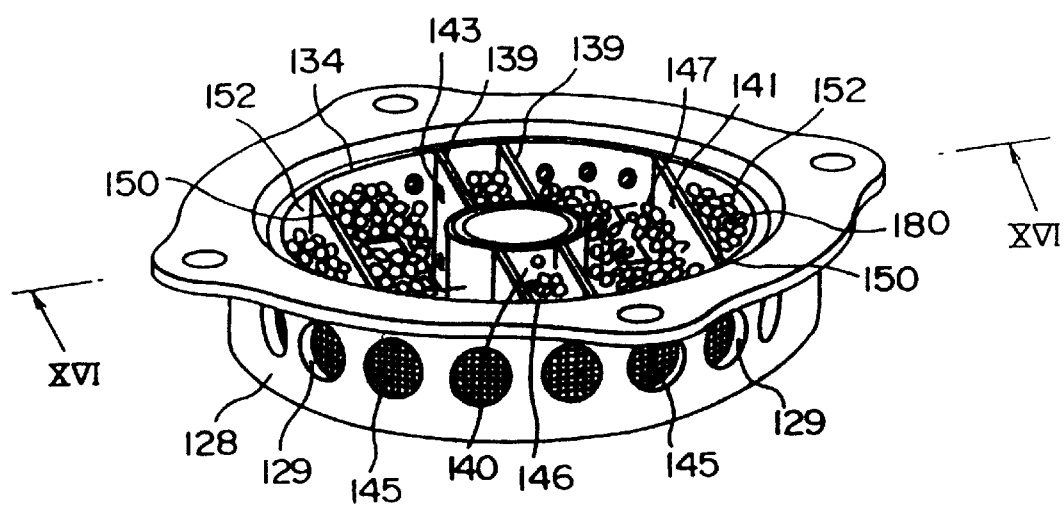
FIG. 15 shows a perspective view of an upper housing of a gas generating apparatus according to a second modification of the third embodiment.
Figure 16:
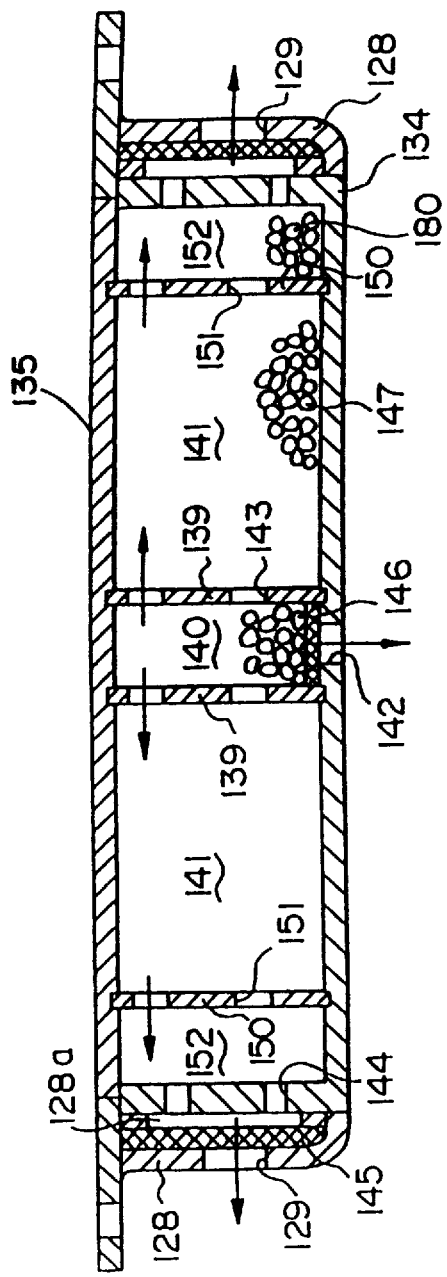
FIG. 16 shows a cross-sectional view of the apparatus of FIG. 15 taken along the line XVI—XVI thereof.

With reference to FIGS. 15 and 16, a second modification of the third embodiment of the invention will be explained. FIG. 15 is a perspective view of an upper housing of the gas generating apparatus according to the second modification. FIG. 16 is a cross-sectional view of the apparatus of FIG. 15 taken along the line XVI—XVI thereof. The numerals in FIGS. 15 and 16 which are the same as the numerals in FIGS. 10 to 12 denote the same members thereof.

The second modification is basically constructed the same as the third embodiment, but is different from the third embodiment in the following points. Bulkheads 150 and 150 formed of a pair of plate members are arranged outside of the second chamber 141 so as to connect the walls of the housings 134 and 135, and third burning chambers 152 and 152 are defined outside of the bulkheads 150 and 150. The bulkheads 150 and 150 comprise portions 151 communicating with the second and third chambers 141 and 152. The communicating portions 151 are the same as the portions 143 of the bulkhead 139, for example, a large number of through-holes, and may have films or plates so as to allow the gas to pass therethrough when the pressure of the gas in the second chamber 141 reaches a predetermined value. Also, the communicating portions 151 may have relief valves that operate when the pressure in the second chamber 141 reaches a predetermined value. The gas generating agents 180 in the shapes of granule are accommodated in the third chamber 152. The third chamber 152 is communicated with the air bag 132 via the communicating portions 144, the space 128a of the outer housing 128, and the communicating portions 129.

Also, the bulkheads 150 and 150 may not always be arranged in parallel with each other. For example, as the bulkheads 150 and 150 are extended outwardly in the radial direction, the bulkheads 150 and 150 may be gradually separated from each other. That is, the bulkheads 150 and 150 may be formed in whatever shapes or configurations.

Figure 23:
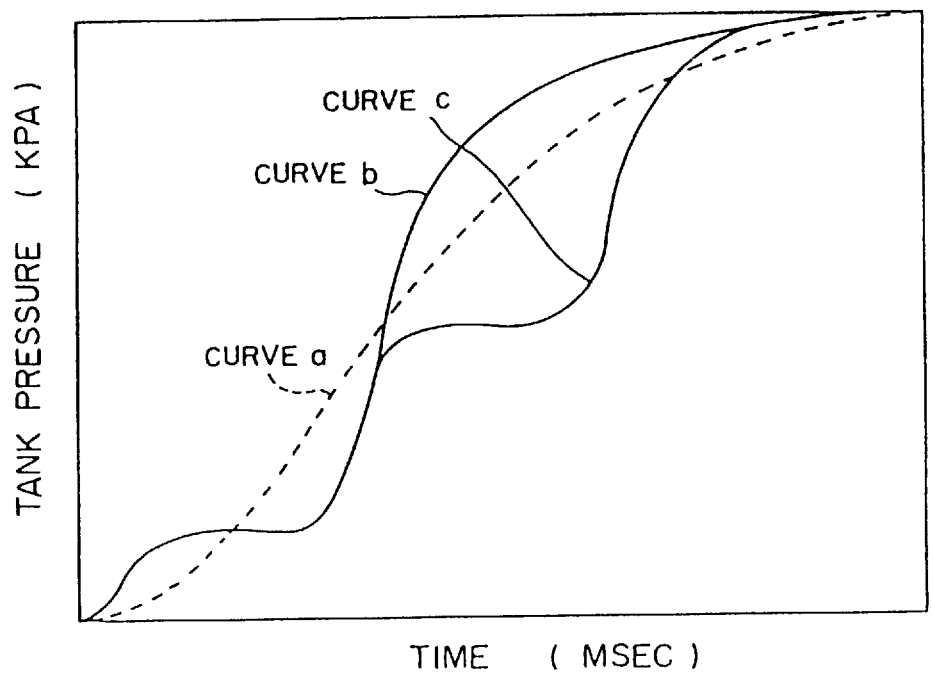
FIG. 23 is a graph showing the results of the Tank Test concerning some examples.

As the second modification is constructed above, the pressure performance of the Tank Test can have curve c as shown in FIG. 23.

Figure 17:
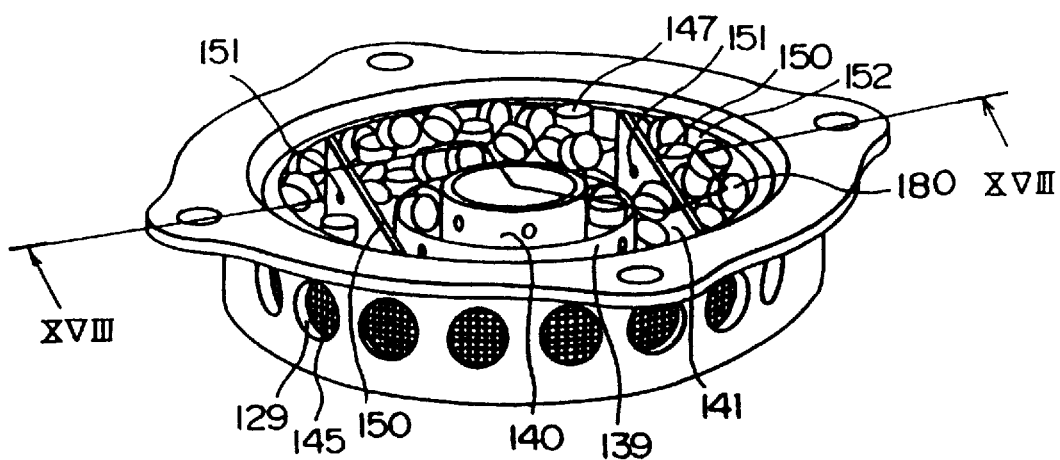
FIG. 17 shows a perspective view of an upper housing of a gas generating apparatus according to a third modification of the third embodiment.
Figure 18:
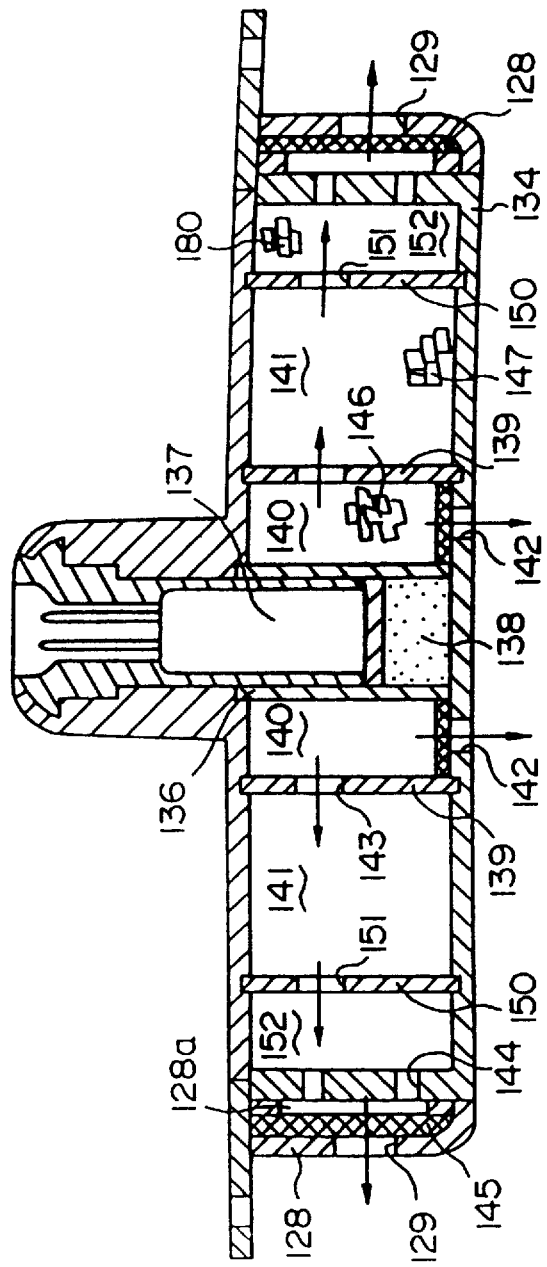
FIG. 18 shows a cross-sectional view of the apparatus of FIG. 17 taken along the line XVIII—XVIII thereof.

With reference to FIGS. 17 and 18, a third modification of the third embodiment of the invention will be explained. FIG. 17 is a perspective view of an upper housing of the gas generating apparatus according to the third modification. FIG. 18 is a cross-sectional view of the apparatus of FIG. 17 taken along the line XVIII—XVIII thereof. The numerals in FIGS. 17 and 18 which are the same as the numerals in FIGS. 10 to 12 denote the same members thereof.

The third modification is basically constructed the same as the first modification, but is different from the first modification in the following points. A cylindrical bulkhead 139 is arranged concentrically with the igniter 137, and third chambers 152 and 152 are defined outside of the second chamber 141 by a pair of plate-shaped bulkheads 150 and 150. The communicating portions 151 are constructed the same as the second modification. In the present embodiment, also, the pressure performance of the Tank Test can have the curve c as shown in FIG. 23.

Figure 19:
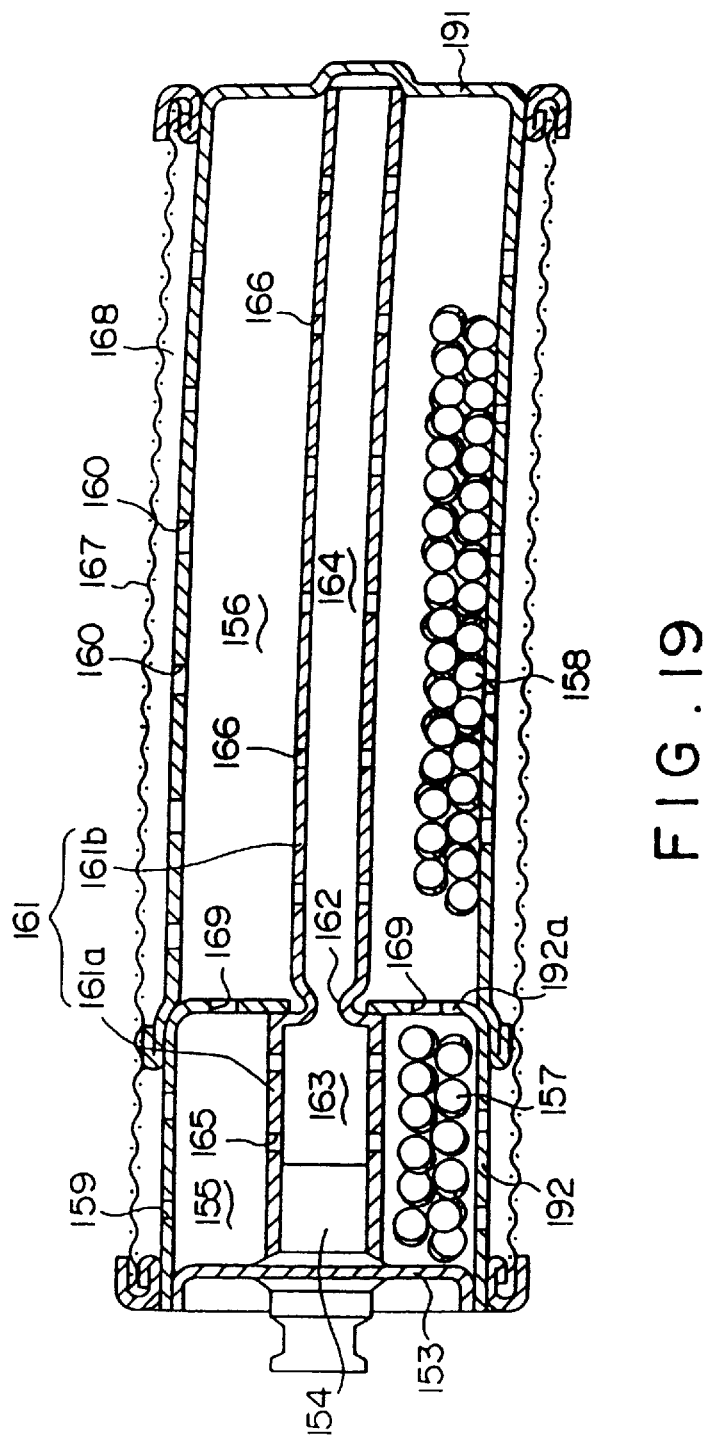
FIG. 19 is a cross-sectional view of a gas generating apparatus according to a fourth embodiment of the present invention.

Now, referring to FIG. 19, a gas generating apparatus according to a fourth embodiment of the present invention will be described. FIG. 19 is a cross-sectional view of the gas generating apparatus of the fourth embodiment.

The gas generating apparatus according to the present embodiment is used for a passenger seat air bag which is provided in the instrument panel of the passenger room. As shown in FIG. 19, the apparatus is provided with a cylindrical housing 191 extended along an axis line, and the housing 191 is connected to a cylindrical housing 192. The housing 192 is covered at the other end with a cover member 153. An igniter 154 is attached to the cover member 153. A bulkhead 192a which extends radially inwardly from the housing 192 is provided on a portion connecting the housing 191 with the housing 192. The internal space of the housings 191 and 192 is divided into a first burning chamber 155 and a second burning chamber 156 by the bulkhead 192a. Gas generating agents 157 and 158 are respectively accommodated in the first and second chamber 155 and 156. The gas generating agents 157 and 158 as shown in FIG. 19 have shapes of tablets, but the gas generating agents may have shapes of disks or granules. The housings 191 and 192 are formed with portions 159 and 160 communicating the first and second chamber 155 and 156 with the air bag.

An igniting tube 161 which accommodates the igniter 154 at one end thereof extends along the axial direction in the housings 191 and 192. The igniting tube 161 comprises a first tube portion 161a extending along the axial direction in the first chamber 155, a second tube portion 161b extending along the axial direction in the second chamber 156, a throat portion 162 provided on a portion connecting the first tube portion 161a with the second tube portion 161b. In the embodiment, the first tube portion 161a, the second tube portion 161b, and the throat portion 162 are integrally formed. In case that they are integrally formed, the number of the parts may be decreased and the manufacturing may be facilitated.

In the present embodiment, first and second igniting chambers 163 and 164 are defined in the first and second tube portions 161a and 161b. The first tube portion 161a is formed with portions 165 communicating the first igniting chamber 163 with the first burning chamber 155. The second tube portion 161b is formed with portions 166 communicating the second igniting chamber with the second burning chamber 156.

The housings 191 and 192 are surrounded by a cylindrical sieve member 167 outwardly in the radial direction. A predetermined volume of a space 168 is formed between the housings 191 and 192 and the sieve member 167. When the gas generating agents 157 and 158 have characteristics which do not need filters, the sieve member 167 prevents burned fouling produced as a result of burning of the agents from jumping up outwardly, and, at the burning, the sieve member 167 restrains sparks from ejecting from the communicating portions 159 and 160.

As the throat portion 162 is arranged between the first and second tube portions 161a and 161b, heated particles with high pressure and temperature are ejected from the igniter 154 so that the heated particles are stored in the first igniting chamber 163. After a minute time, the heated particles are ejected from the first igniting chamber 163 via the communicating portions 165 into the first chamber 155 so that the agents 157 in the first chamber 155 are burned. At the same time, the heat particles are ejected from the first igniting chamber 163 via the throat portion 162 into the second igniting chamber 164. After the heated particles are injected via the communicating portions 165 into the first chamber 155, the pressure and heat quantity in the second igniting chamber 164 reach predetermined values. As a result, the heat particles are ejected from the second igniting chamber 164 via the communicating portions 166 into the second chamber 156 so that the agents 158 in the second chamber 156 are burned.

In such manner, after the heated particles are injected into the first chamber 155, the pressure and heat quantity in the second igniting chamber 164 reach predetermined values so that the delay time is obtained. The reason for this is as follows. When the heated particles are ejected from the first igniting chamber 163 to the first chamber 155, the pressure and heat quantity in the first igniting chamber 163 decrease. Thus, remaining particles in the first igniting chamber 163 are ejected via the throat portion 162 into the second igniting chamber 164. At this time, as the second igniting chamber 164 has a predetermined volume, it takes predetermined time (i.e., delay time) until the pressure and heat quantity in the second igniting chamber 164 reaches the predetermined values enough to burn the agents 158 in the second chamber 156. In such a manner, the delay time can be obtained.

As described above, by the throat portion 162, the transmission of the heat and pressure to the second igniting chamber 164 is delayed so that there is provided the delay time in the burning in the second chamber 156 after the burning of the first chamber 155. The delay time is adjusted by the size of the throat portion 162.

The throat portion 162 may be constructed discrete from the first and second tube portions 161a and 161b. In this case, the delay time can be easily adjusted by exchanging the throat portion 162.

The first tube portion 161a and/or the second tube portion 161b and/or the throat portion 162 may be provided with ignition booster charges. The ignition booster charge is, for example, $B/KNO_3$ composition. The ignition booster charges may be inserted into the first tube portion 161a, the second tube portion 161b and the throat portion 162, as discrete units. Also, the ignition booster charges may be adhered to internal surfaces of the first tube portion 161a, the second tube portion 161b and the throat portion 162. Further, the first tube portion 161a and/or the second tube portion 161b and/or the throat portion 162 may be provided with rapid detonating cords (RDC). The igniting of the gas generating agents in the first and second chambers 155 and 156 can be securely performed, and the igniting of the second chamber 156 can be delayed.

The bulkhead 192a may be provided with portions 169 directly communicating with the first and second chambers 155 and 156. Via the communicating portions 169, the gas at high temperature and pressure generated by the gas generating agents 157 in the first chamber 155 can be supplied into the second chamber 156 so that the burning of the gas generating agents 158 in the second chamber 156 can be controlled by the cross area and the number of the communicating portions 169. Further, the communicating portions 169 may have a plate, film, or foil which can be broken to pass therethrough when the pressure in the first chamber reaches a predetermined value. Thus, there is provided the delay time in burning of the gas generating agents 158 in the second chamber 156 after burning of the gas generating agents 157 in the first chamber 155. Also, the thickness of the plate etc., can be selected based on a relation between cross-sectional area of the communicating portions 169 and pressure to be broken thereof.

The fourth embodiment is constructed as described above so that the operation thereof is as follows.

When the igniter 154 is ignited, heated particles or sparks from the igniter 154 can be supplied via the first tube portion 161a and the communicating portion 165 into the first chamber 155 so that the gas generating agents 157 in the first chamber 155 can be burned. The gas generated in the first chamber 155 can be supplied into the air bag via the communicating portion 159 so that the cover is broken up and the air bag is inflated at the first stage in the shape of mushroom.

Especially, in the embodiment, by the throat portion 162, the transmission of the heat and pressure to the second igniting chamber 164 is delayed so that there is provided the delay time in burning in the second chamber 156 after the burning of the first chamber 155.

Therefore, the transmission of the heat and pressure from the first tube portion 161a to the second tube portion 161b is delayed. The heated particles or sparks are supplied from the second tube portion 161b via the communicating portions 166 to the second chamber 156 so that the gas generating agents 158 in the second chamber 156 can be burned. The gas generated in the second chamber 156 is supplied via the communicating portions 160 into the air bag so that the air bag can be fully inflated.

In the fourth embodiment, in the same manner as in the first embodiment, after the pressure of the gas generated by burning of the gas generating agents 157 in the first chamber 155 reaches a maximum value, a cover for the air bag is broken up, and then the pressure of the gas generated by burning the gas generating agents 158 in the second chamber 156 reaches a maximum value. Thus, as described above, heat losses can be reduced.

Figure 20:
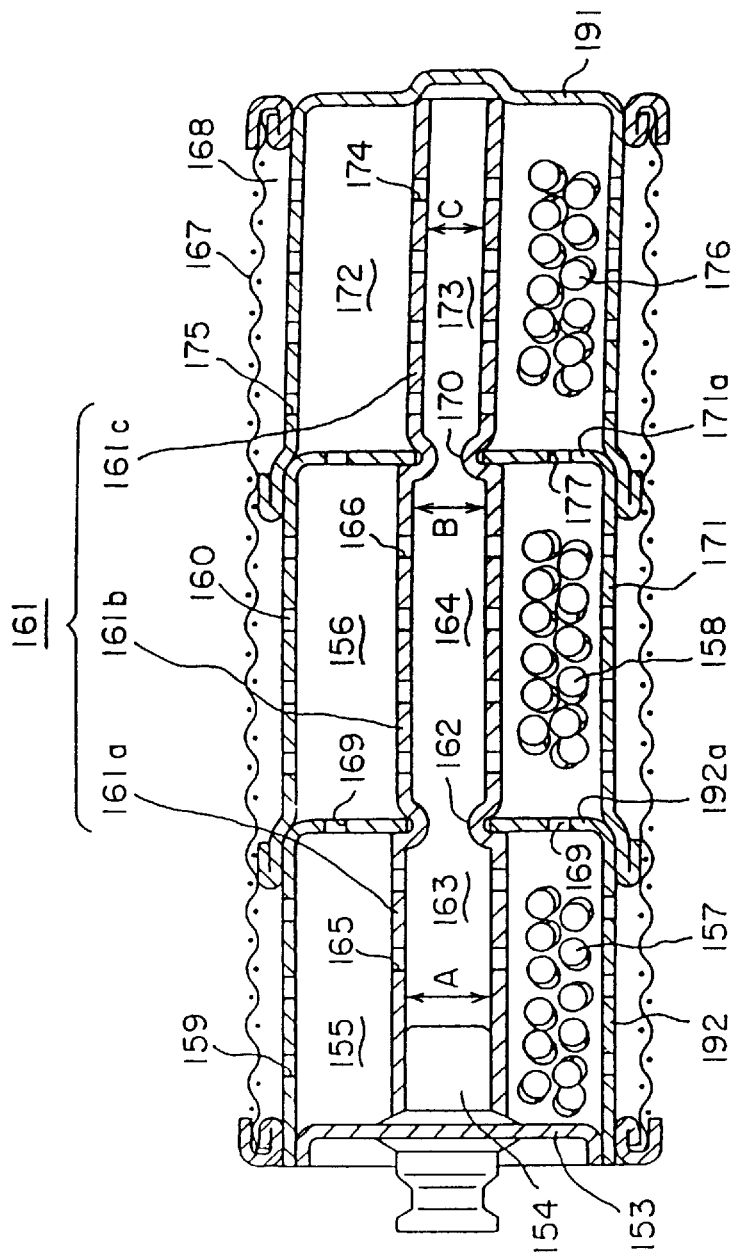
FIG. 20 is a cross-sectional view of a gas generating apparatus according to a modification of the fourth embodiment.
Figure 21:
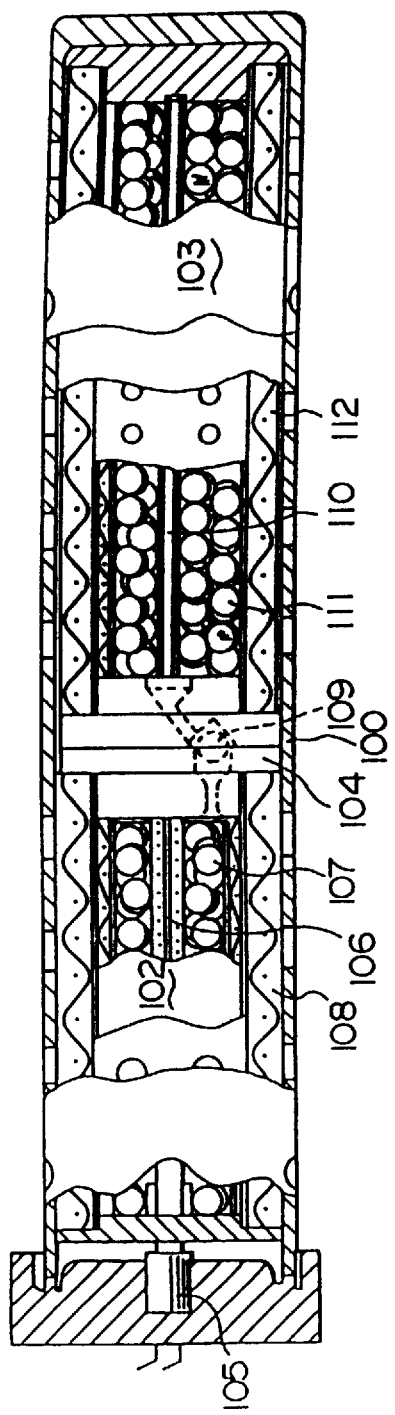
FIG. 21 shows a cross-sectional view of a gas generating apparatus of the prior art.
Figure 22:
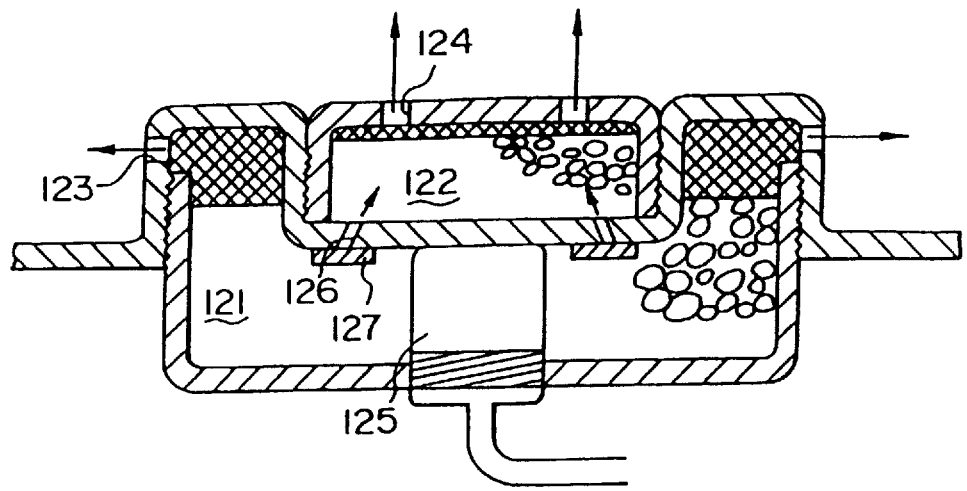
FIG. 22 shows a cross-sectional view of another gas generating apparatus of the prior art.

Now, with reference to FIG. 20, a gas generating apparatus according to a modification of the fourth embodiment will be explained. FIG. 20 is a cross-sectional view of the gas generating apparatus of the modification. The numerals in FIG. 20 which are the same as the numerals in FIG. 19 denote the same member thereof.

In the modification, the housing 191 is formed shorter than that of the fourth embodiment, and an intermediate housing 171 is arranged between the housings 191 and 192. The intermediate housing 171 has a bulkhead 171a extending inwardly in radial directions and dividing the second burning chamber 156 and a third burning chamber 172. The igniting tube 161 has a third tube portion 161c extending along the axial direction in the third chamber 172, in addition to the first and second tube portions 161a and 161b. A throat portion 170 is arranged between the second and third tube portions 161b and 161c. The throat portion 170 may be constructed discrete from the tube portions. The third tube portion 161c is defined with a third igniting chamber 173, and has portions 174 communicating the third igniting chamber 173 with the third burning chamber 172. The housing 191 is formed with portions 175 communicating the third burning chamber 172 with the air bag.

Further, the diameter (A) of the first tube portion 161a, the diameter (B) of the second tube portion 161b, and the diameter (C) of the third tube portion 161c satisfy the following formula.

A>B>C

The reason for this is as follows. In the same manner as in the fourth embodiment, the transmission of the heat and pressure from the igniting chamber 163 to the second igniting chamber 164 is delayed by the throat portion 162. Thereafter, the transmission of the heat and pressure from the second igniting chamber 164 to the third igniting chamber 173 is delayed by the throat portion 170. Also, the igniter 154 is only arranged at one end of the igniting tube 161. Thus, in case that the diameters of the tube portions 161a to 161c have the same sizes, as the heat and pressure are transmitted in turn from the first igniting chamber 163 via the second igniting chamber 164 to the third igniting chamber 173, there is a fear that the heats and pressures in the chambers are gradually decreased. In order to prevent decrease of the pressure and heat in the chambers, as described above, the diameters of the tube portions 161a to 161c are made smaller in this order. In case that the gas generating apparatus having three burning chambers is provided with the two igniters arranged at both ends of the igniting tube, the diameter (A) of the first tube portion 161a, the diameter (B) of the second tube portion 161b, and the diameter (C) of the third tube portion 161c may have the same sizes.

In an operation of the modification, the transmission of the heat and pressure from the second igniting chamber 164 to the third igniting chamber 173 is delayed by the throat portion 170. Thus, there is provided the delay time in burning the gas generating agents 176 in the third chamber 172 after the burning in the first and second chambers 155 and 156 so that the gas generated in the third chamber 172 is supplied via the communicating portions 175 to the air bag.

The bulkhead 171a may be provided with portions 177 communicating directly with the second and third chambers 156 and 172. Via the communicating portions 177, the gas at high temperature and pressure generated by the gas generating agents 158 in the second chamber 156 can be supplied into the third chamber 172 so that the burning of the gas generating agents 176 in the third chamber 172 can be controlled by the cross-sectional area and the number of the communicating portions 177.

While the presently preferred embodiments of the present invention have been shown and described, it is to be understood that this disclosure is for the purpose of illustration and that various changes and modification may be made without departing from the scope of the invention as set forth in the appended claims. Especially, the shape of the burning chamber and the composition of the agent is not limited to the embodiments.

What is claimed is:

1. A gas generating apparatus for an automobile air bag having a cover; comprising a first chamber containing first gas generating agents; an igniter which is actuated when an automobile crash is detected to ignite said first gas generating agents; first passage means communicating said first chamber with said air bag and metallic foil covering said first passage means;

a second chamber containing second gas generating agents extending about said first chamber; gas bores communicating said second chamber with said first chamber; second passage means communicating said second chamber with said air bag and metallic foil covering said second passage means;

said igniter upon being actuated causing said first gas generating agents in said first chamber to ignite to generate a first gas rupturing the metallic foil covering said first passage means and a portion of said first gas flowing into said air bag through said first passage means, and a further portion of said first gas flowing into said second chamber to ignite the second gas generating agents to generate a second gas rupturing the metallic foil covering said second passage means and flowing into said air bag, said first passage means being differently sized relative to the gas bores between said first and second chambers and the positioning of the rupturable metallic foil over said first and second passage means causing said cover to be torn open to facilitate expansion of said air bag after the first gas in said first chamber has reached a maximum pressure and said second gas in said second chamber reaches a maximum pressure after said cover has been torn open and at a time delay caused by a difference in the sizes between the first passage means and the gas bores between said first and second chambers.

2. A gas generating apparatus according to claim 1, wherein said igniter has an igniter housing (35), said first chamber (30) being disposed annularly around said igniter housing (35).

3. A gas generating apparatus according to claim 1, wherein said second passage means comprises gas bores (15) formed in an outer wall of the second chamber.

* * * * *